United States Patent
Kim et al.

(10) Patent No.: US 10,474,241 B2
(45) Date of Patent: Nov. 12, 2019

(54) METHOD AND DEVICE FOR TRANSMITTING/RECEIVING DATA USING HDMI

(71) Applicant: LG ELECTRONICS INC., Seoul (KR)

(72) Inventors: Dokyun Kim, Seoul (KR); Hyunsik Yang, Seoul (KR); Hyeonjae Lee, Seoul (KR); Jangwoong Park, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 15/318,336

(22) PCT Filed: Jun. 12, 2015

(86) PCT No.: PCT/KR2015/005955
§ 371 (c)(1),
(2) Date: Dec. 12, 2016

(87) PCT Pub. No.: WO2015/190877
PCT Pub. Date: Dec. 17, 2015

(65) Prior Publication Data
US 2017/0115740 A1    Apr. 27, 2017

Related U.S. Application Data

(60) Provisional application No. 62/011,046, filed on Jun. 12, 2014.

(51) Int. Cl.
*G06F 3/01*     (2006.01)
*H04N 21/41*    (2011.01)
(Continued)

(52) U.S. Cl.
CPC .............. *G06F 3/017* (2013.01); *G06F 3/005* (2013.01); *G09G 5/006* (2013.01);
(Continued)

(58) Field of Classification Search
None
See application file for complete search history.

(56) References Cited

U.S. PATENT DOCUMENTS

2010/0066919 A1*  3/2010  Nakajima ............... H04B 1/205
                                                 348/734
2011/0157310 A1*  6/2011  Mitani .................. H04N 5/775
                                                 348/43
(Continued)

FOREIGN PATENT DOCUMENTS

KR   1020080043421   5/2008
KR   1020090066582   6/2009
KR      100935375   1/2010

OTHER PUBLICATIONS

PCT International Application No. PCT/KR2015/005955, International Search Report dated Sep. 25, 2015, 2 pages.

*Primary Examiner* — Stephen T. Reed
(74) *Attorney, Agent, or Firm* — Lee Hong Degerman Kang & Waimey

(57) ABSTRACT

The present invention is related to a method and an apparatus for transmitting and receiving data by using HDMI (High Definition Media Interface). A method and an apparatus according to the present invention comprises requesting reading EDID (Extended Display Identification Data) from a sink device in case the sink device is connected; receiving from the sink device EDID including capability information of the sink device, wherein the capability information indicates whether the sink device is capable of processing gesture information; requesting gesture information indicating a predetermined gesture which may be rec- (Continued)

ognized or extracted from the sink device on the basis of the EDID; and receiving the gesture information from the sink device.

12 Claims, 32 Drawing Sheets

(51) Int. Cl.
*H04N 21/436* (2011.01)
*G09G 5/00* (2006.01)
*H04N 5/44* (2011.01)
*H04N 21/422* (2011.01)
*H04N 21/4363* (2011.01)
*G06F 3/00* (2006.01)

(52) U.S. Cl.
CPC ........... *H04N 5/4403* (2013.01); *H04N 21/41* (2013.01); *H04N 21/42207* (2013.01); *H04N 21/436* (2013.01); *H04N 21/43635* (2013.01); *G09G 2320/0261* (2013.01); *G09G 2354/00* (2013.01); *G09G 2370/047* (2013.01); *G09G 2370/06* (2013.01); *G09G 2370/12* (2013.01)

(56) References Cited

U.S. PATENT DOCUMENTS

| | | |
|---|---|---|
| 2014/0130091 A1 | 5/2014 | Liu et al. |
| 2016/0246057 A1* | 8/2016 | Hasegawa ................. G09G 5/00 |
| 2017/0055005 A1* | 2/2017 | Nakajima ............ H04N 21/436 |

* cited by examiner

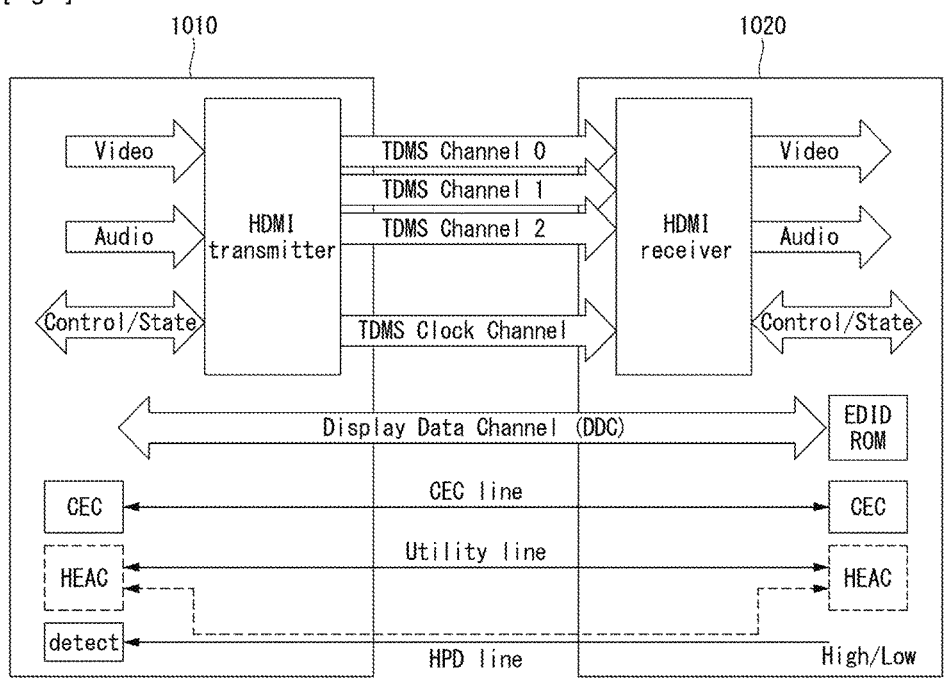
[Fig.1]

[Fig.2]
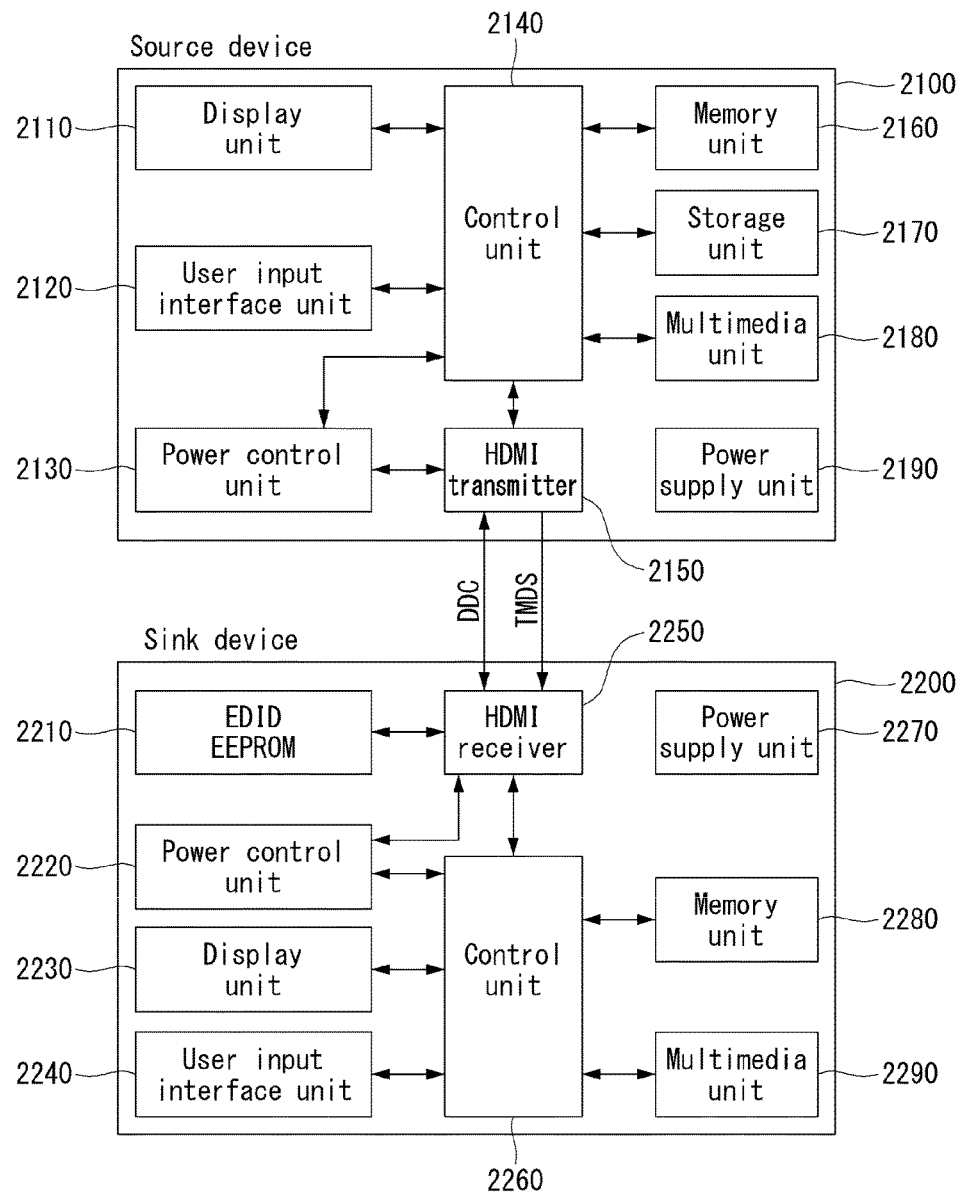

[Fig.3]

| Address | No. Bytes | Description |
|---|---|---|
| 00h ~ 07h | 8 | Header information. Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital), Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings. Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

[Fig.4]

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

[Fig.5]

(a) Video Data Block

| Byte # | Bits 5-7 | Bits 0-4 |
|---|---|---|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

[Fig.6]

| Byte / Bits # | 7 | 6 | 5 | 4 | 3 | 2 | 1 | 0 |
|---|---|---|---|---|---|---|---|---|
| 0 | Vendor Specific Tag Code (=3) | | | Length(=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Indpendent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| ...N | Reserved (0) | | | | | | | |

[Fig.7]

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1`0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

[Fig.8]
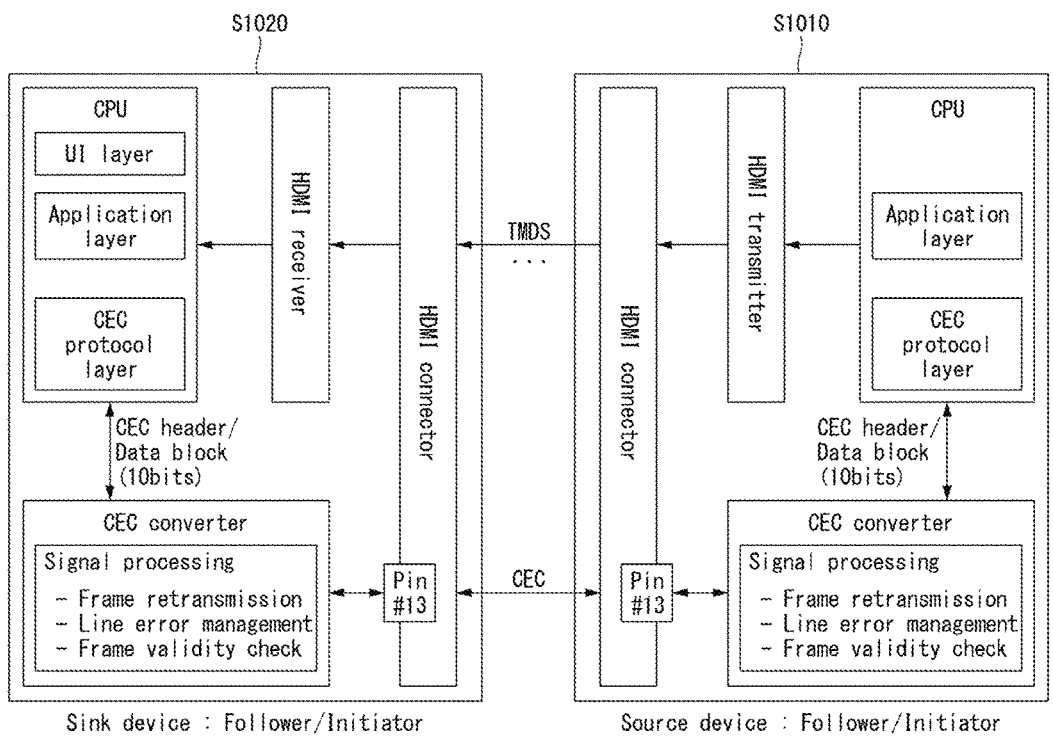

[Fig.9]
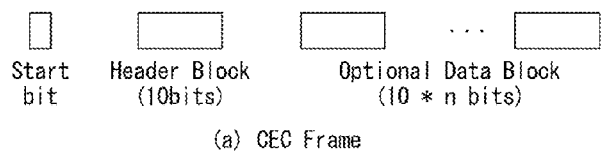
(a) CEC Frame
| Name | Description |
|---|---|
| Start | Special Start 'bit' |
| Header Block | Source and Destination addresses (Logical Address) |
| Data Block 1 (opcode block) | Opcode(optional) |
| Data Block 2 (operand blocks) | Operand(s) specific to opcode (optional, depending on opcode) |
(b) CEC frame structure
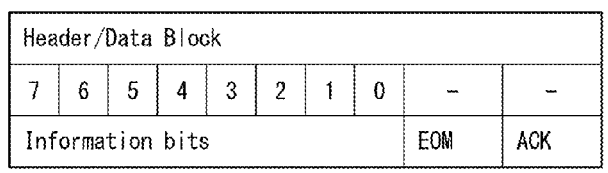
(c) CEC header and data block

[Fig.10]
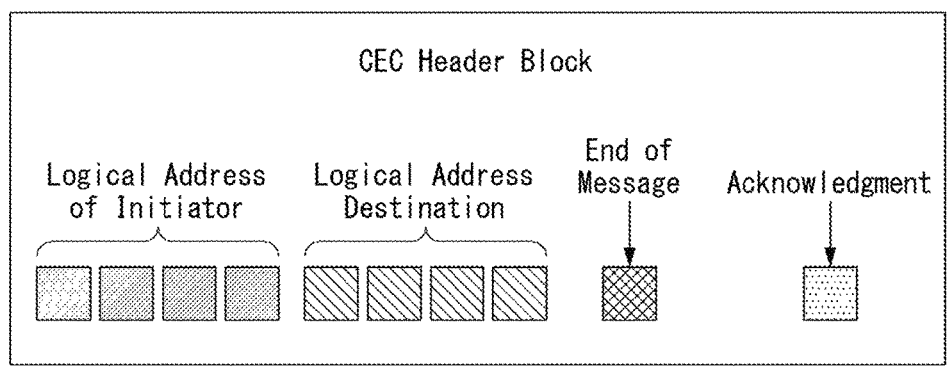
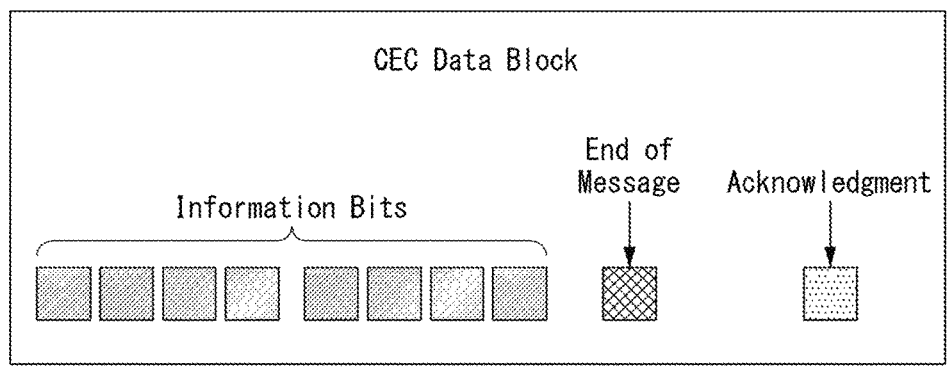

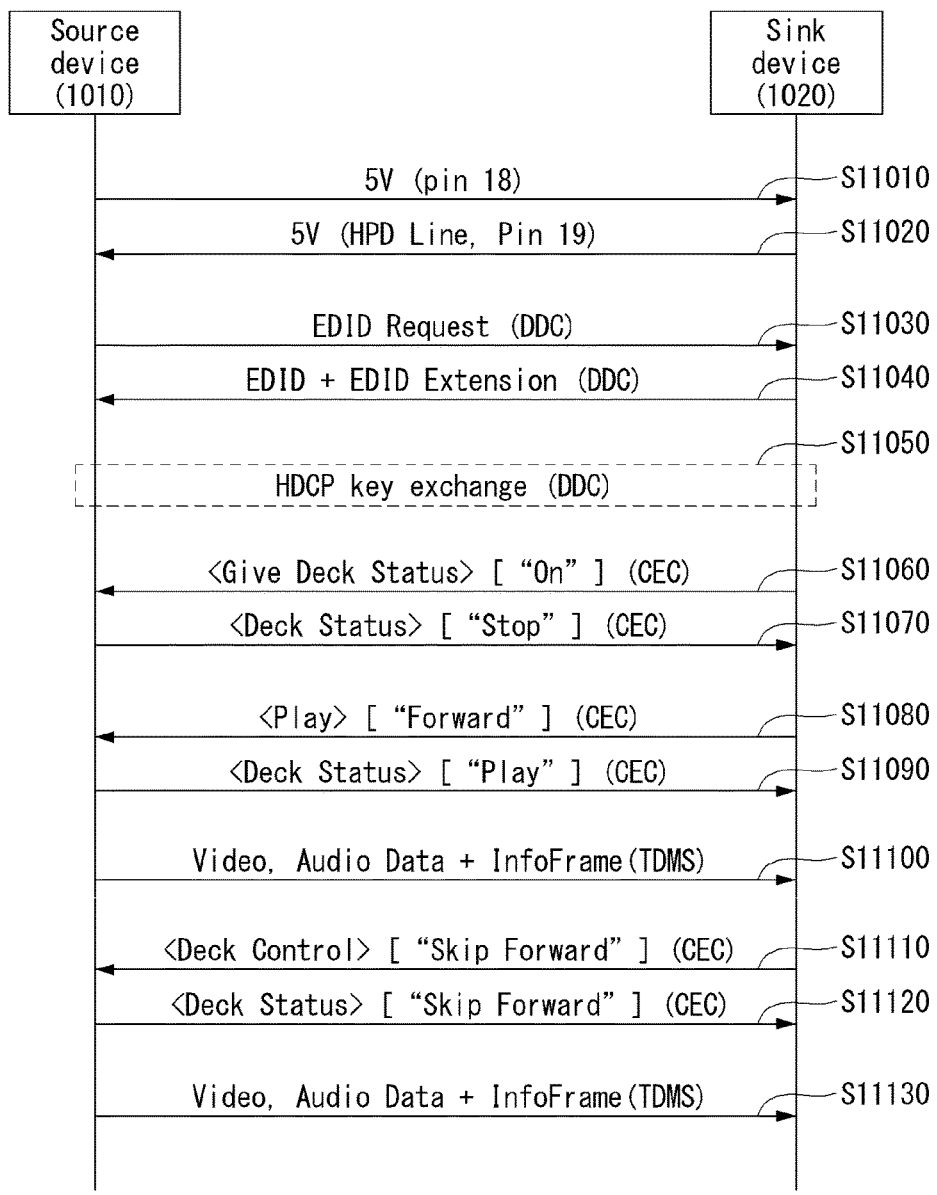

[Fig.12]
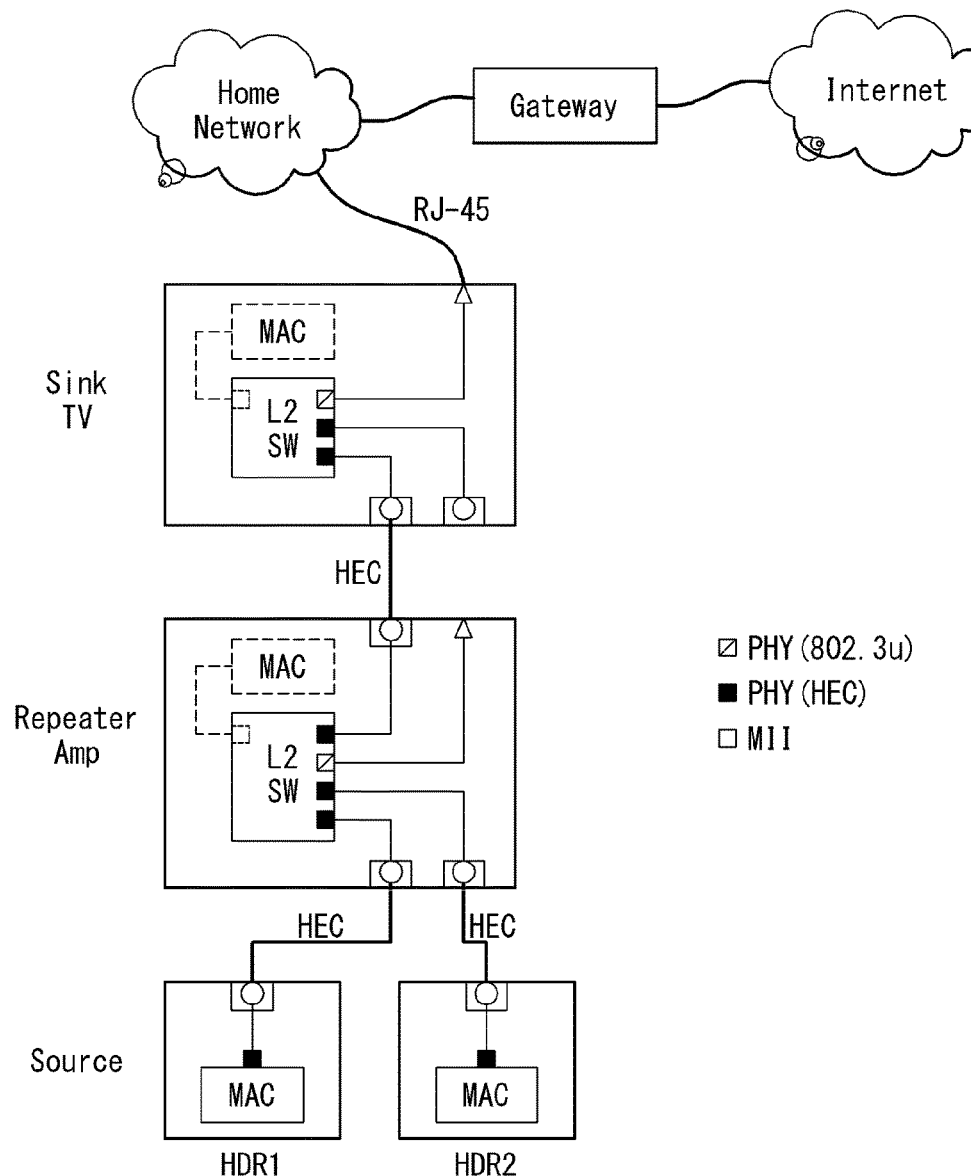

[Fig.13]
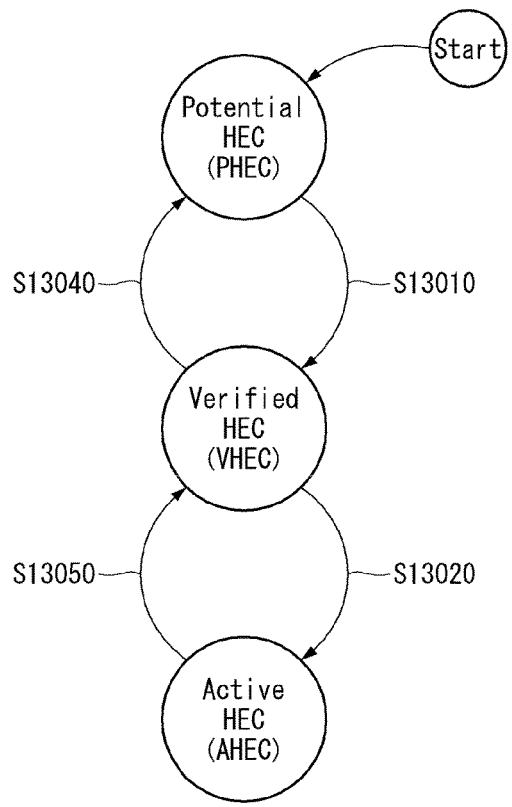
(a) HEC channel state transition diagram
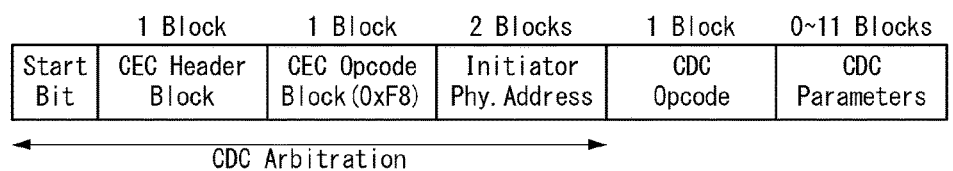
(b) CDC message frame

[Fig.14]
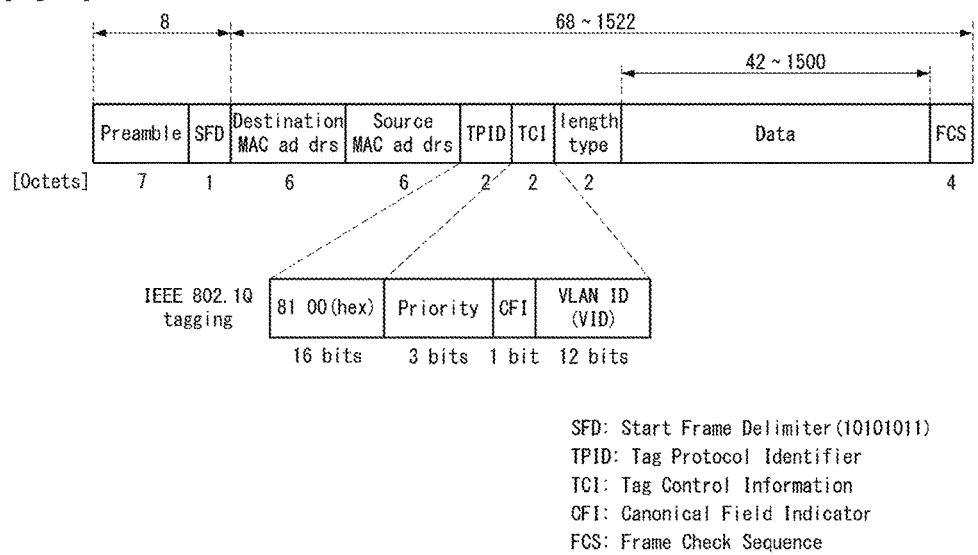

[Fig.15]
| Data Type | Data |
|---|---|
| Face | Face info |
| Hand | Face + hand info |
| Body | Face + hand + body info |
(a) Gesture Information
(b) Face Information
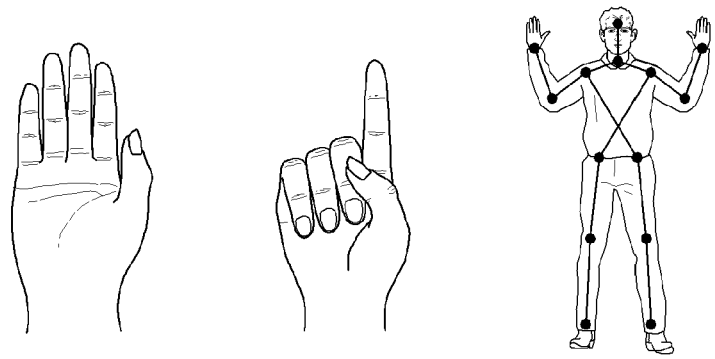
(c) Hand/body information

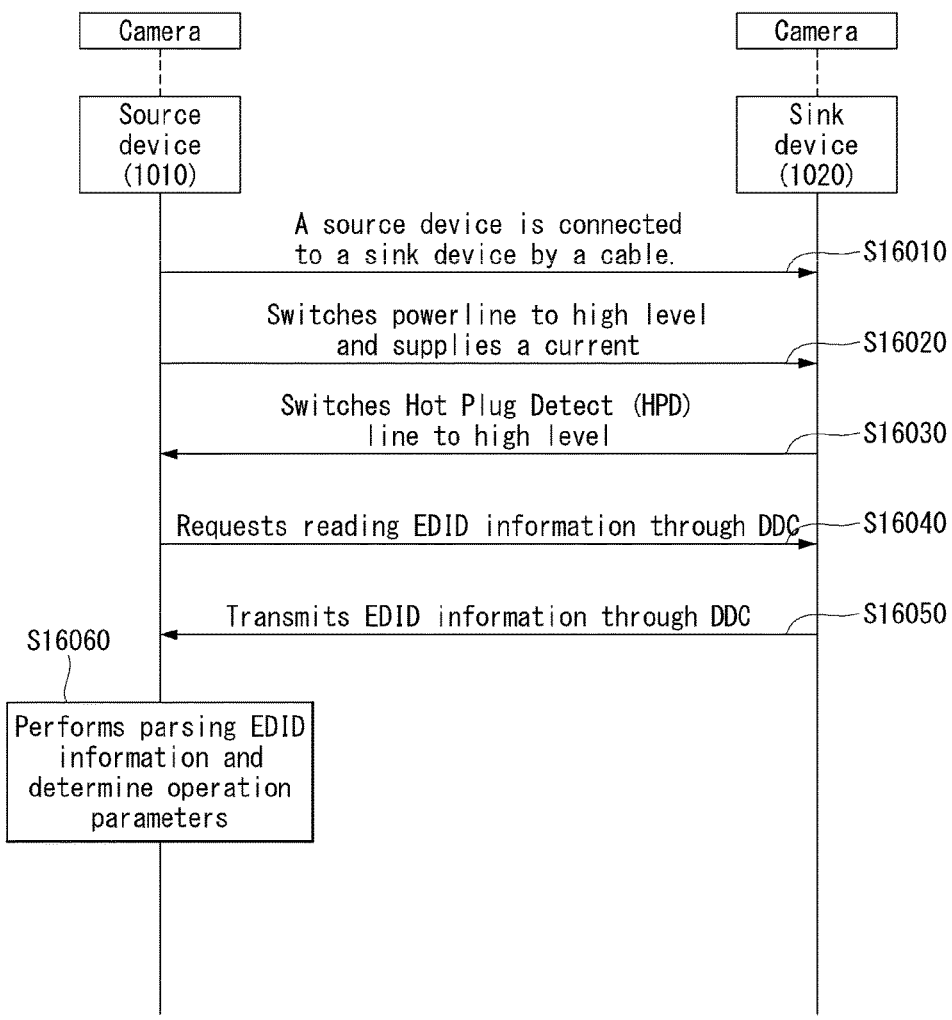
[Fig.16]

[Fig.17]
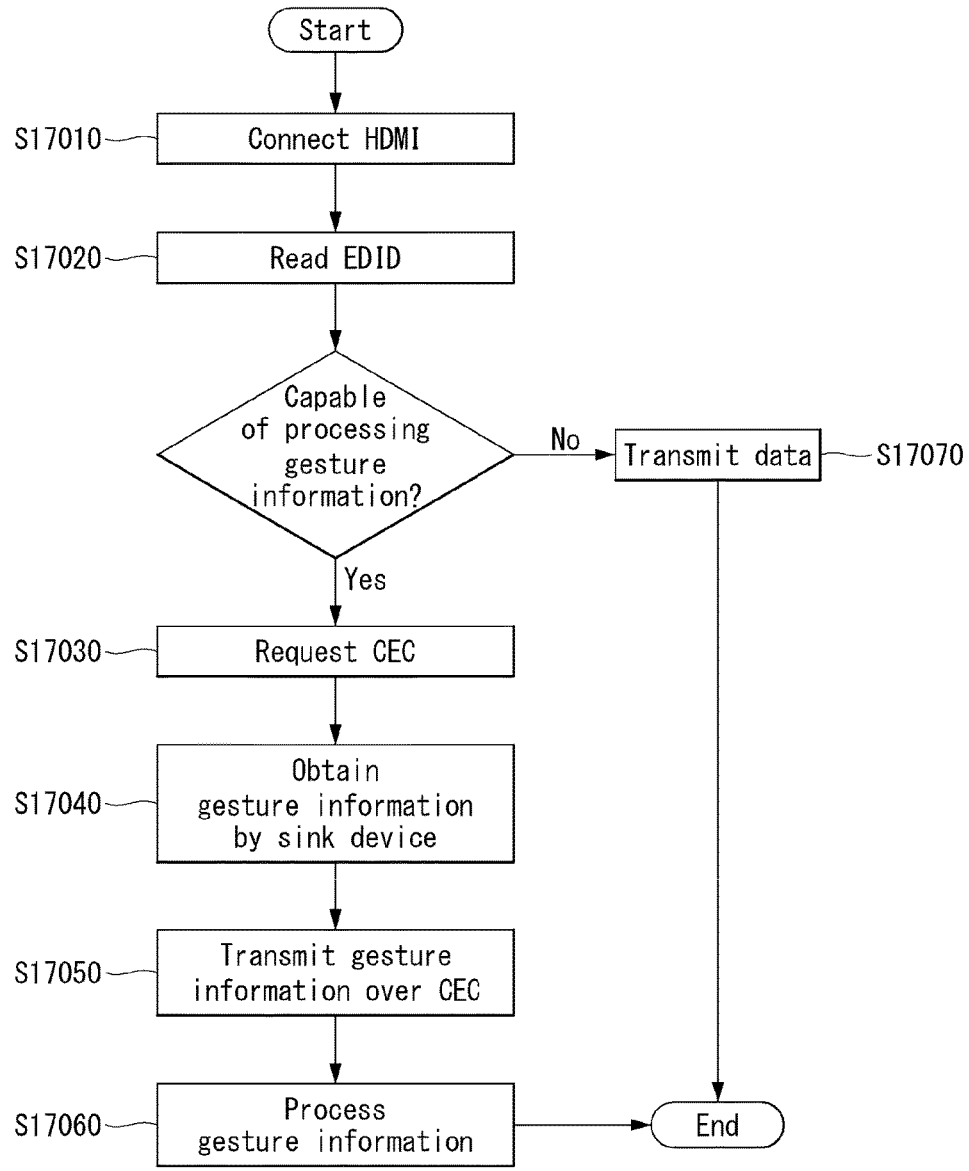

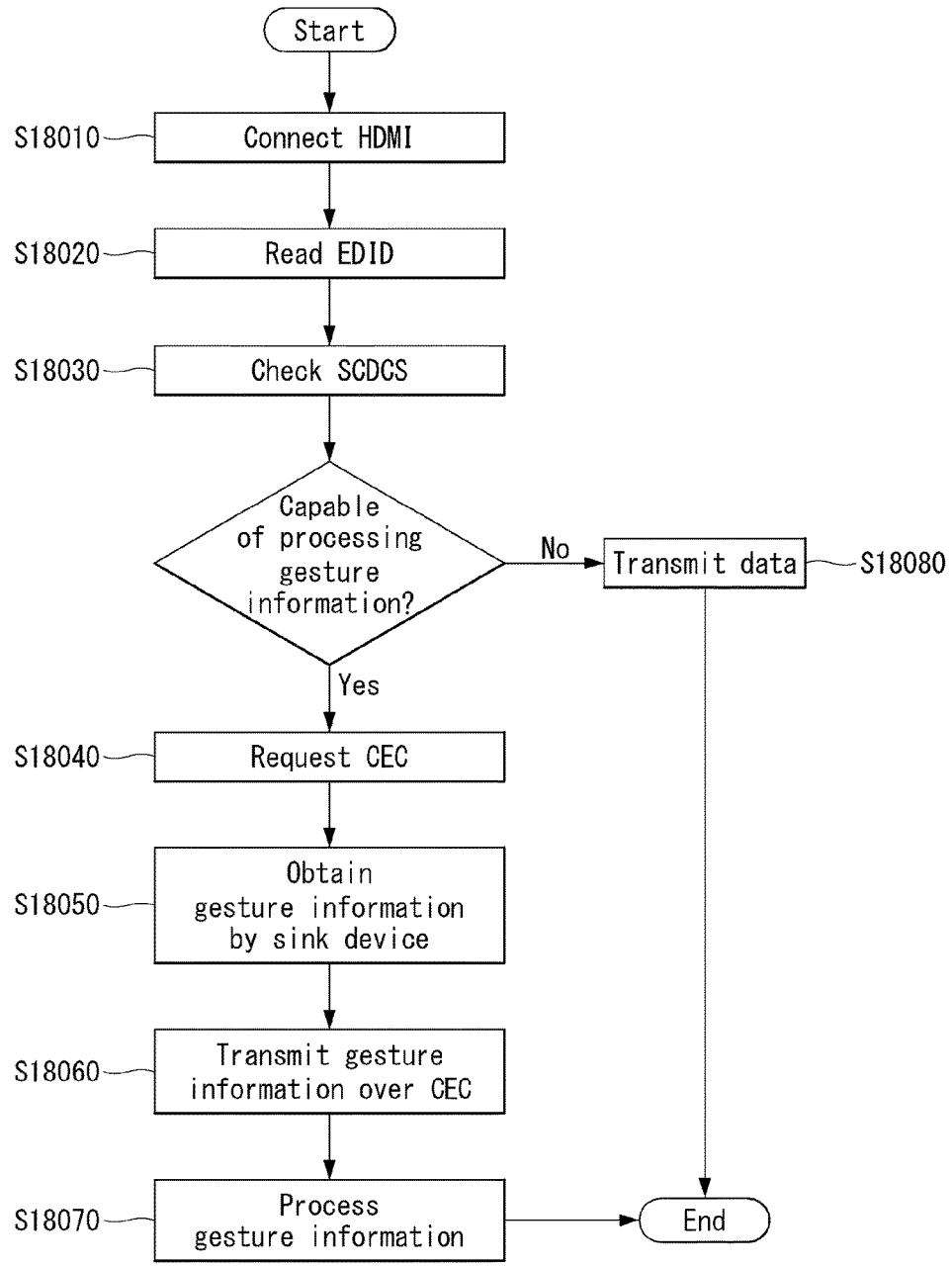

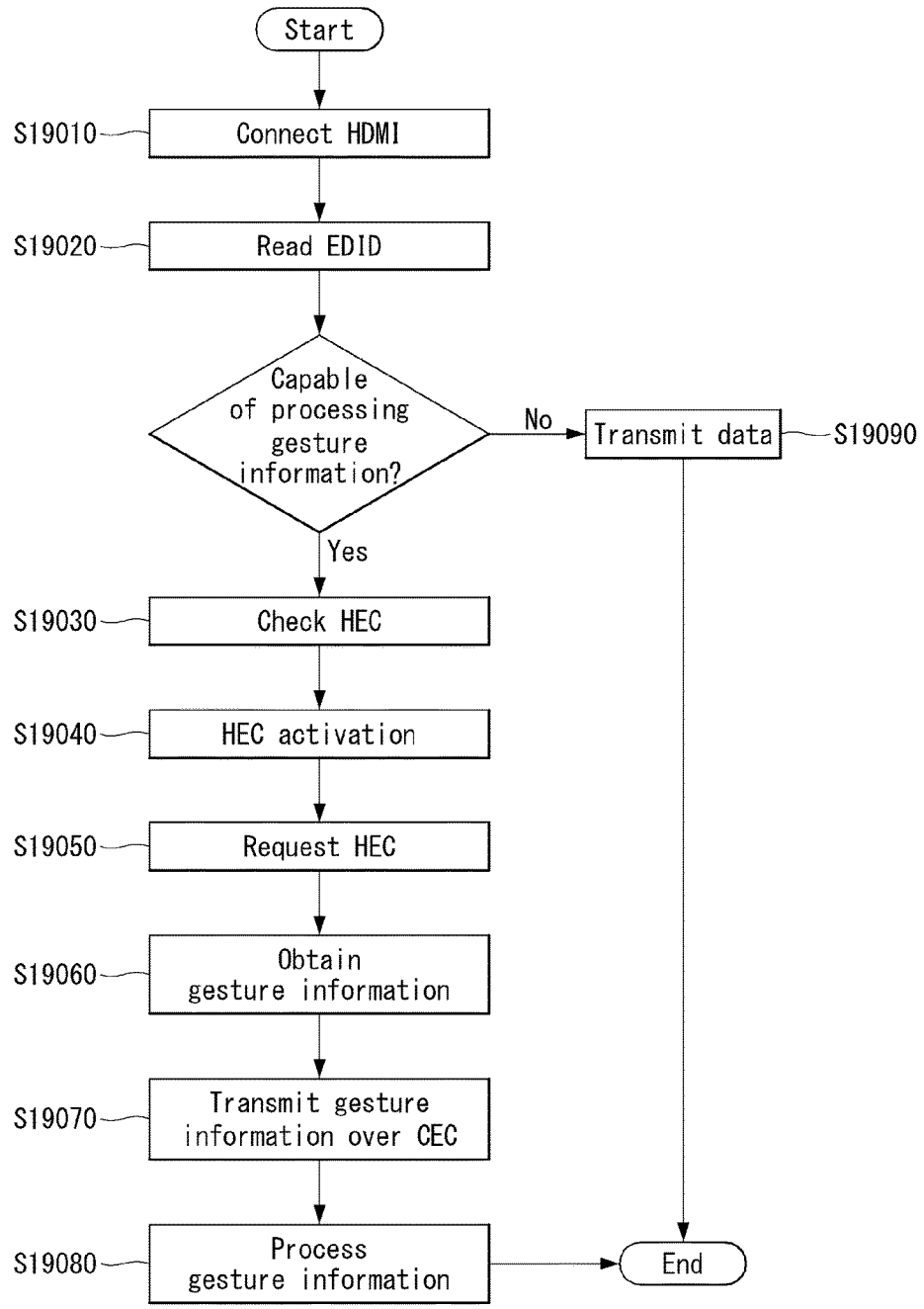

[Fig.20]
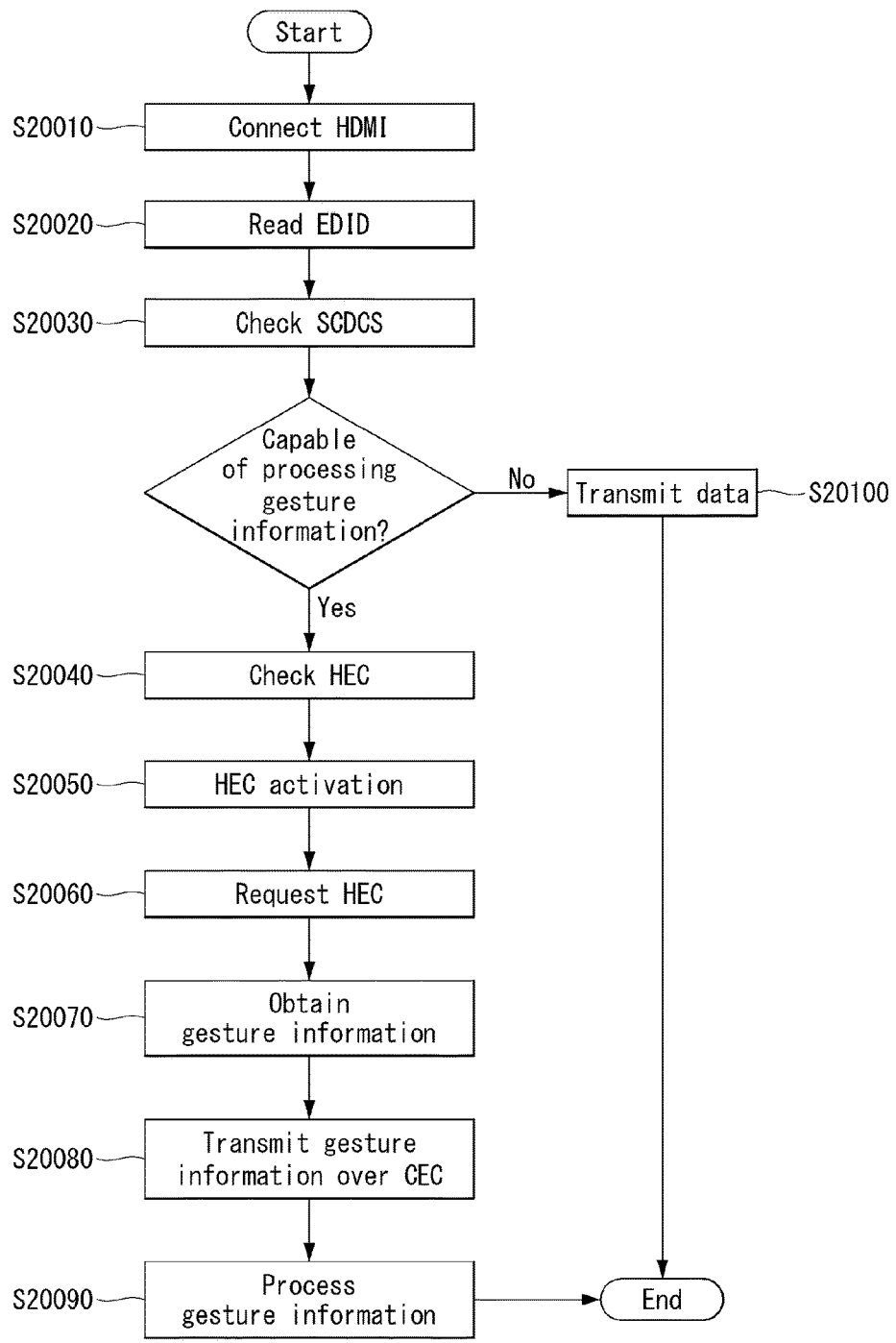

[Fig.21]
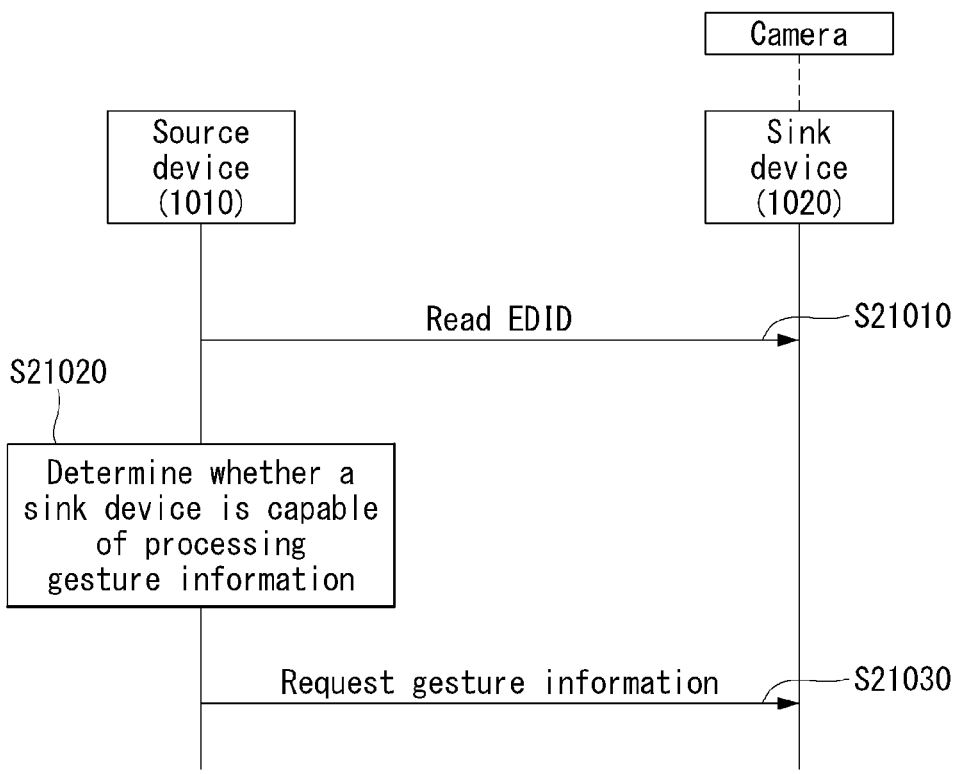

[Fig.22]

| Byte / Bits # | 7 | 6 | 5 | 4 | 3 | 2 | 1 | 0 |
|---|---|---|---|---|---|---|---|---|
| 0 | Vendor Specific Tag Code (=3) | | | | Length (=N) | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=2) | | | | | | | |
| 5 | Max_TMDS_Character_Rate | | | | | | | |
| 6 | SCDC_Present | RR_Capable | Rsvd(0) | Rsvd(0) | LTE_340Mcs c_scramble | Indpendent _view | Dual_ View | 3D_OSD_ Disparity |
| 7 | Rsvd(0) | Rsvd(0) | Rsvd(0) | Gesture_ Capable | Gesture_ Present | DC_48bit _420 | DC_36bit _420 | DC_30bit _420 |
| ...N | Reserved (0) | | | | | | | |

[Fig.23]
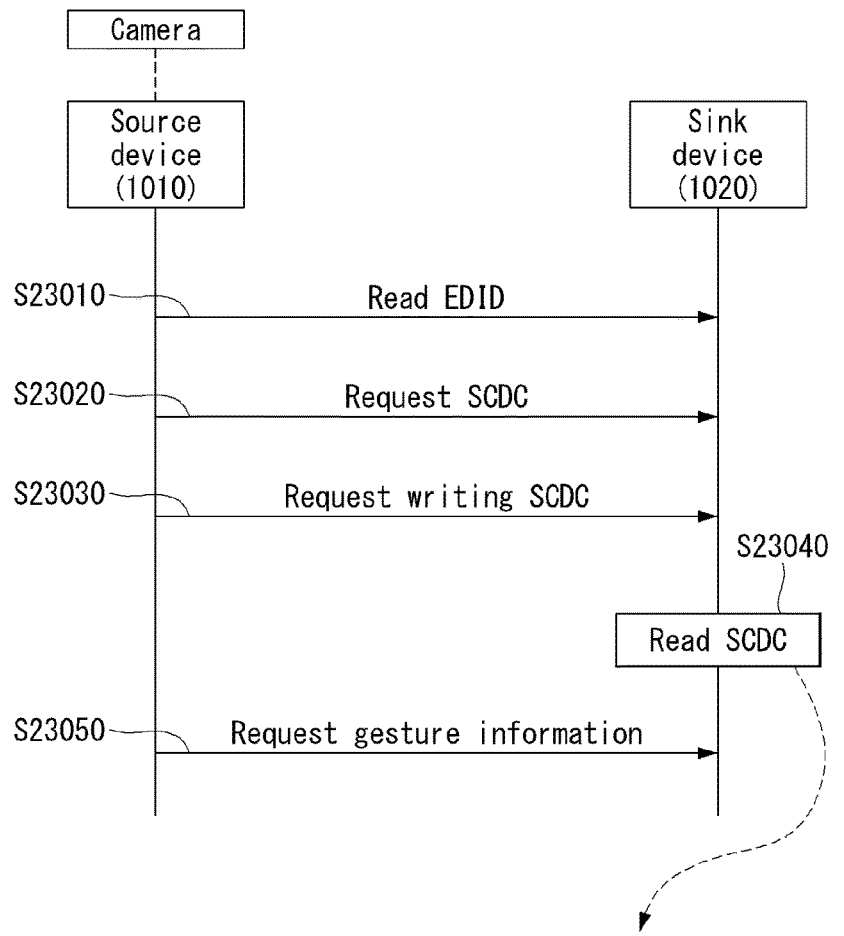
(a) Fields in the SCDCS related to gesture information processing

[Fig.24]
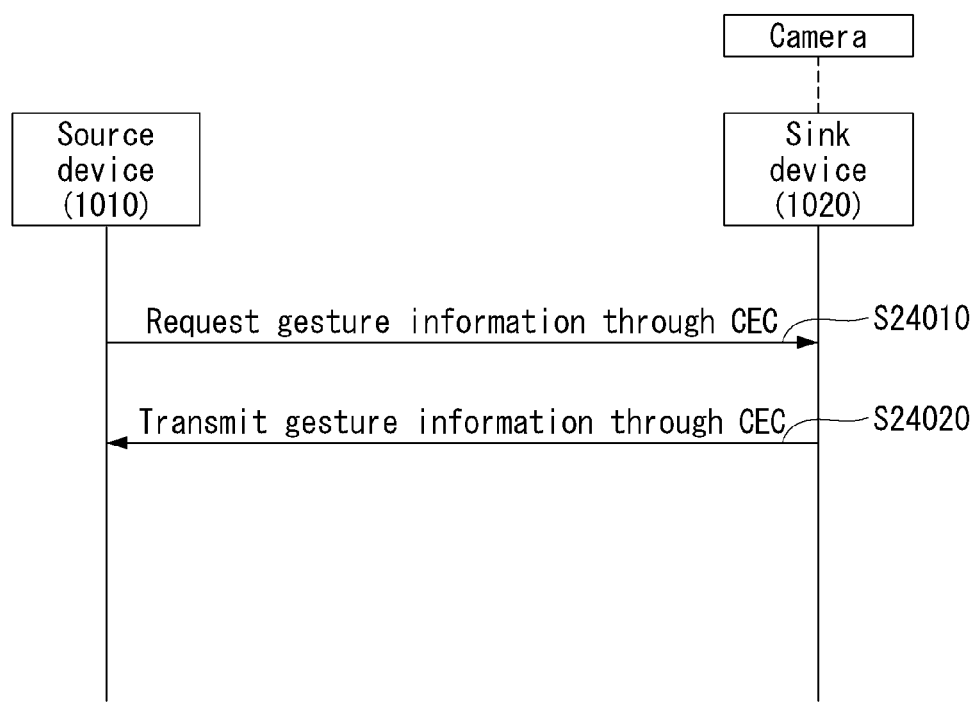

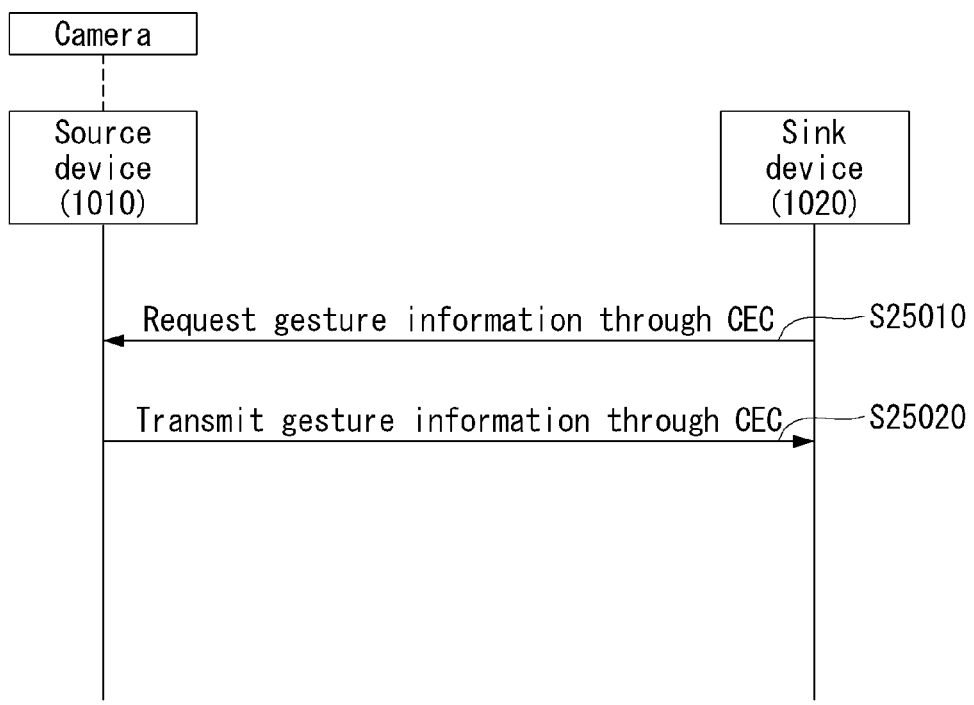

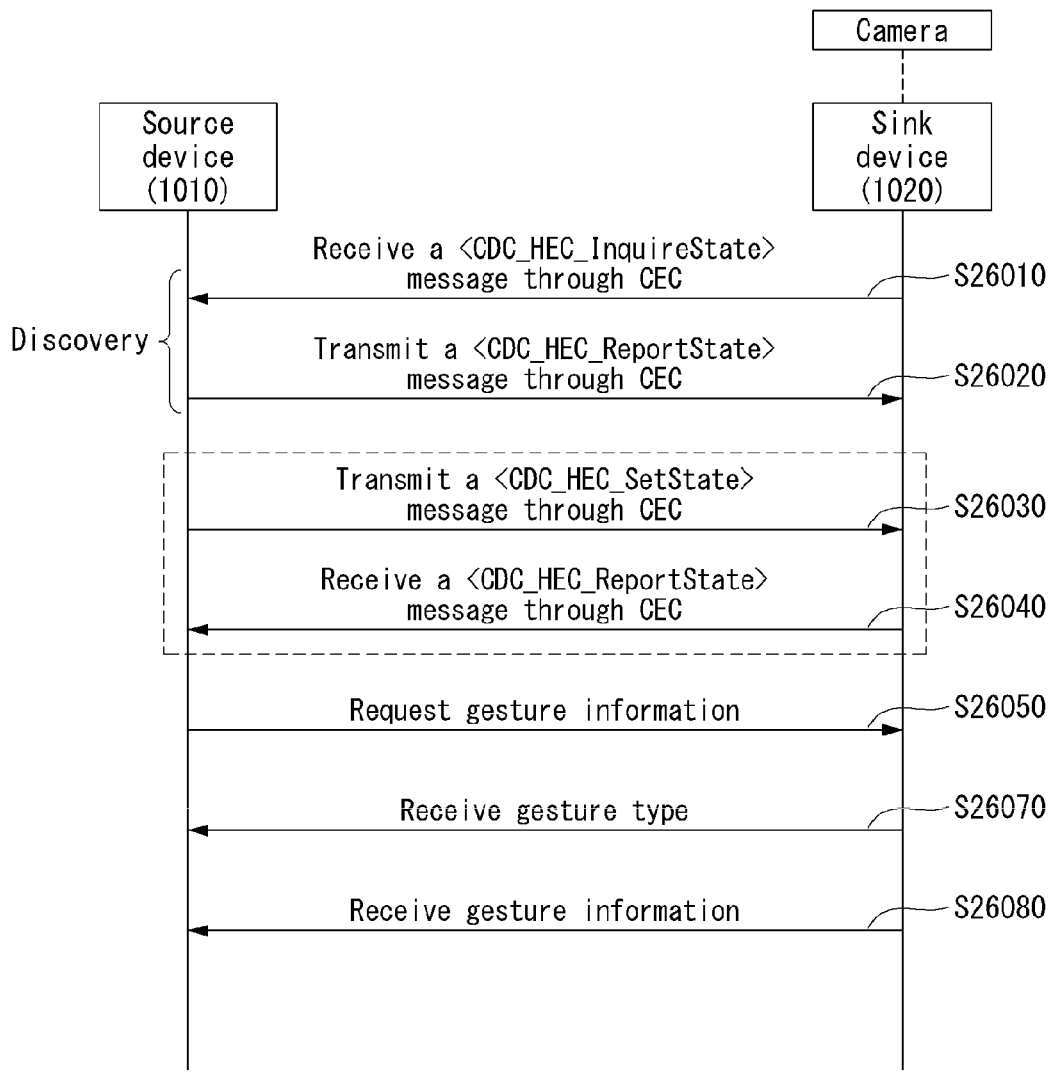
[Fig.26]

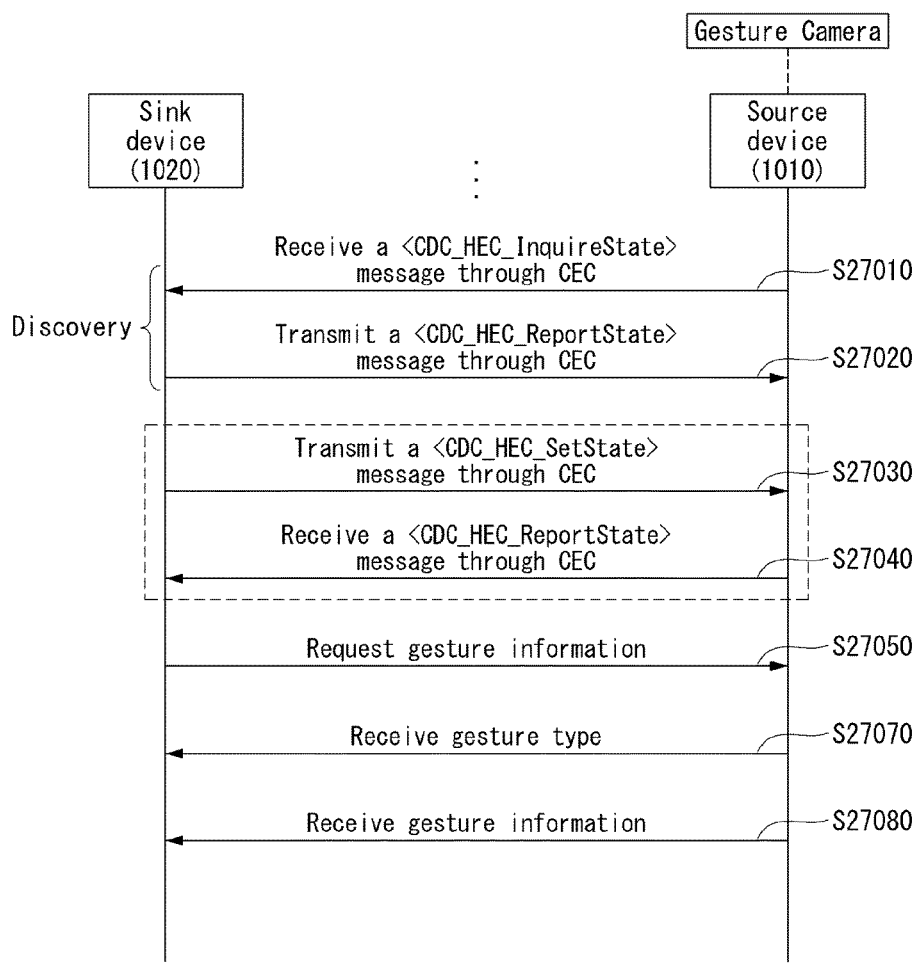
[Fig.27]

[Fig.28]
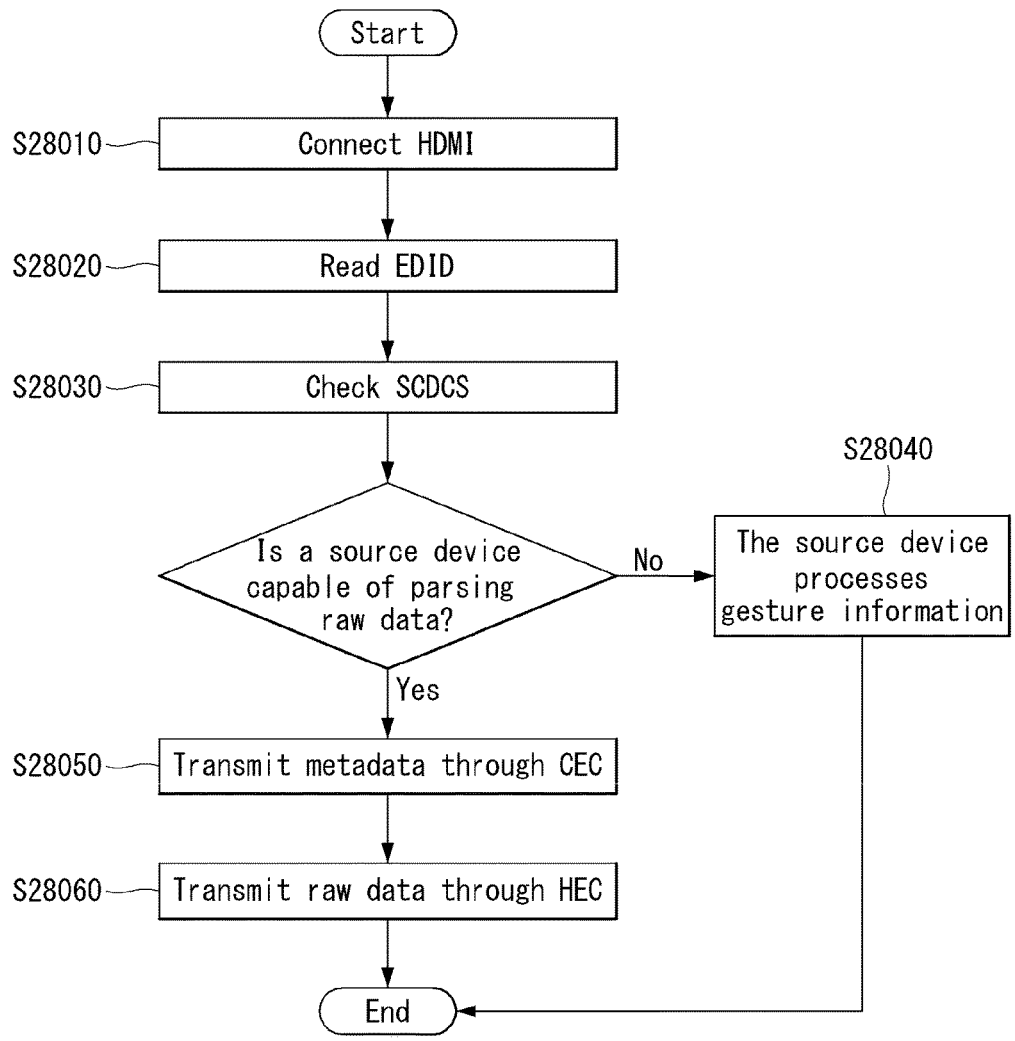

[Fig.29]

| Opcode | value | Description | Parameters | Parameter Description | Response | Addressing | | mandatory | |
|---|---|---|---|---|---|---|---|---|---|
| | | | | | | Direct | Broadcast | Initiator | Follower |
| <Request Gesture Capability> | | Request Gesture Meta Data | Position Info | Face, Hand, Body position information | <Report Gesture Capability> | ○ | | | |
| <Report Gesture Capability> | | Report Gesture data | | | | ○ | | | |

[Fig.30]

| Name | Range Description | Length | Purpose |
|---|---|---|---|
| Position Info | Face, Hand, Body position information | r byte | Meta information delivered to a corresponding device, by which gesture processing may be actually performed |
| Gesture Reserved | Reserved Field | s byte | May be added to the field depending on the needs for coordinate information of a gesture in question |

[Fig.31]
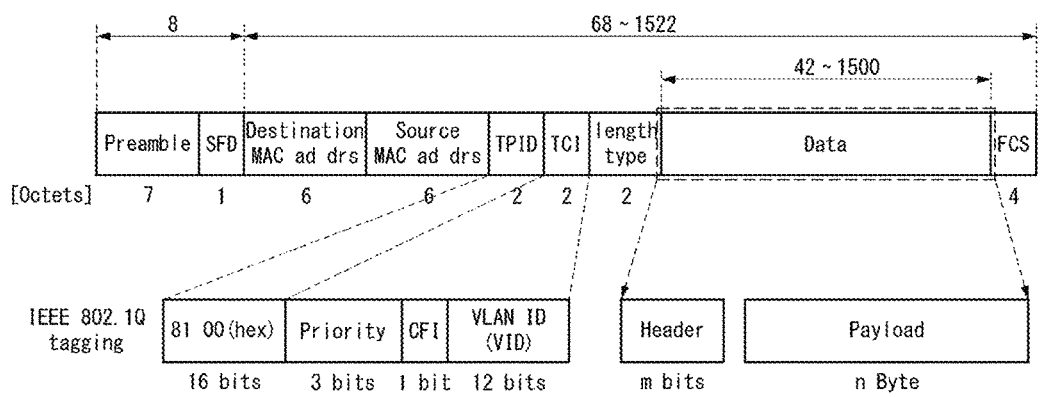

[Fig.32]

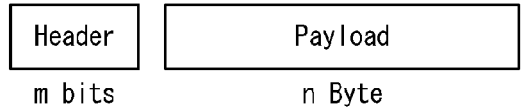

m bits        n Byte (a) Data structure of gesture information

| Name | Description | Size |
|---|---|---|
| Header | Gesture Data의 Header | m bits |
| Payload | Gesture Video Data Payload | n Byte |

(b) Packet information

| Name | Description | Size |
|---|---|---|
| Format | Video Format Information | m bits |
| Resolution | Video Resolution | n bits |
| Gesture_op | Enabled when part of gesture information is transmitted as metadata | o bit |
| Gesture_Rev | Field which may be defined additionally when gesture information is processed | p bit |
| Payload Info | Payload is or not | q bit |

(c) Header information

METHOD AND DEVICE FOR TRANSMITTING/RECEIVING DATA USING HDMI

CROSS-REFERENCE TO RELATED APPLICATIONS

This application is the National Stage filing under 35 U.S.C. 371 of International Application No. PCT/KR2015/005955, filed on Jun. 12, 2015, which claims the benefit of U.S. Provisional Application No. 62/011,046, filed on Jun. 12, 2014, the contents of which are all hereby incorporated by reference herein in their entirety.

TECHNICAL FIELD

The present invention relates to a method and an apparatus for transmitting and receiving data by using HDMI (High Definition Multimedia Interface) and more specifically, a method and an apparatus for transmitting and receiving motion information obtained through a capture device between a sink device and a source device by using HDMI.

BACKGROUND ART

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

DISCLOSURE

Technical Problem

An object of the present invention is to provide a method for transmitting and receiving data between a sink device and a source device through HDMI.

Also, an object of the present invention is to provide a method for transmitting and receiving image data or video data between a sink device equipped with a capture device (for example, camera) and a source device.

Also, an object of the present invention is to provide a method for delivering motion data and information to a source device through a sink device equipped with a capture device.

Also, an object of the present invention is to provide a method for delivering motion data and information from a source device equipped with a capture device to a sink device in case the source device supports the capture device for the sink device not equipped with a capture device.

The technical objects to achieve in this document are not limited to those technical objects described above, but other technical objects not mentioned above may be clearly understood by those skilled in the art to which the present invention belongs from the specifications give below.

Technical Solution

To resolve the technical problem described above, the present invention provides a method and an apparatus for transmitting and receiving data by using HDMI (High Definition Media Interface).

More specifically, a method for transmitting and receiving data according to one embodiment of the present invention comprises requesting reading EDID (Extended Display Identification Data) from a sink device in case the sink device is connected; receiving from the sink device EDID including capability information of the sink device, wherein the capability information indicates whether the sink device is capable of processing gesture information; requesting gesture information indicating a predetermined gesture which may be recognized or extracted from the sink device on the basis of the EDID; and receiving the gesture information from the sink device.

Also, the gesture information according to the present invention is received through raw data including the gesture information or received as metadata extracted from the raw data, wherein the raw data corresponds to video data or image data obtained from the sink device, and the metadata represents the gesture information.

Also, the gesture information according to the present invention is received through at least one of an HDMI CEC (Consumer Electronics Control) channel or HEC (HDMI Ethernet Channel).

Also, according to the present invention, in case the gesture information is received as the metadata, the gesture information is received through the HDMI CEC channel or HEC, and in case the gesture information is received through the raw data, the gesture information is received through the HEC.

Also, the method according to the present invention comprises receiving an inquiry message requesting status information indicating availability of the HEC from the sink device; and transmitting a first reporting message including the status information to the sink device, wherein the status information indicates either activation or inactivation of the HEC.

Also, the method according to the present invention further comprises receiving a set message which activates the HEC from the sink device in case the status information indicates inactivation of the HEC; and activating the HEC and transmitting a second reporting message which includes status information indicating activation status of the HEC to the sink device.

Also, a method according to the present invention, receiving a write request of capability information of the source device included in an SCDCS (Status and Control Data Channel Structure) from the source device, wherein the capability information indicates whether the sink device is capable of processing the gesture information, comprises reading the written capability information; requesting gesture information indicating a predetermined gesture that may be recognized or extracted from the source device on the basis of the reading result; and receiving the gesture information from the source device.

Also, the gesture information according to the present invention is received through raw data including the gesture information or received as metadata extracted from the raw data, wherein the raw data corresponds to video data or image data obtained from the sink device, and the metadata represents the gesture information.

Also, the gesture information according to the present invention is received through at least one of an HDMI CEC (Consumer Electronics Control) channel or HEC (HDMI Ethernet Channel).

Also, according to the present invention, in case the gesture information is received as the metadata, the gesture information is received through the HDMI CEC channel or HEC, and in case the gesture information is received through the raw data, the gesture information is received through the HEC.

Also, the method according to the present invention comprises receiving an inquiry message requesting status information indicating availability of the HEC from the sink device; and transmitting a first reporting message including the status information to the sink device, wherein the status information indicates either activation or inactivation of the HEC.

Also, the method according to the present invention further comprises receiving a set message which activates the HEC from the sink device in case the status information indicates inactivation of the HEC; and activating the HEC and transmitting a second reporting message which includes status information indicating activation status of the HEC to the sink device.

Also, a source device according to the present invention comprises an HDMI transmitter transmitting and receiving data through HDMI; and a controller controlling the HDMI transmitter, wherein the source device requests a sink device to read EDID (Extended Display Identification Data) in case the sink device is connected; receives from the sink device EDID including capability information of the sink device; requests gesture information indicating a predetermined gesture which may be recognized or extracted from the sink device on the basis of the EDID; and receives the gesture information from the sink device, wherein the capability information indicates whether the sink device is capable of processing the gesture information.

Also, the gesture information according to the present invention is received through raw data including the gesture information or received as metadata extracted from the raw data, wherein the raw data corresponds to video data or image data obtained from the sink device, and the metadata represents the gesture information.

Also, the gesture information according to the present invention is received through at least one of an HDMI CEC (Consumer Electronics Control) channel or HEC (HDMI Ethernet Channel).

Also, according to the present invention, in case the gesture information is received as the metadata, the gesture information is received through the HDMI CEC channel or HEC, and in case the gesture information is received through the raw data, the gesture information is received through the HEC.

Also, a sink device according to the present invention comprises an HDMI transmitter transmitting and receiving data through HDMI; and a controller controlling the HDMI transmitter, wherein the sink device receives a write request of capability information of the source device included in an SCDCS (Status and Control Data Channel Structure) from the source device; reads the written capability information; requests gesture information indicating a predetermined gesture that may be recognized or extracted from the source device on the basis of the reading result; and receives the gesture information from the source device, wherein the capability information indicates whether the sink device is capable of processing the gesture information.

Also, the gesture information according to the present invention is received through raw data including the gesture information or received as metadata extracted from the raw data, wherein the raw data corresponds to video data or image data obtained from the sink device, and the metadata represents the gesture information.

Also, the gesture information according to the present invention is received through at least one of an HDMI CEC (Consumer Electronics Control) channel or HEC (HDMI Ethernet Channel).

Also, according to the present invention, in case the gesture information is received as the metadata, the gesture information is received through the HDMI CEC channel or HEC, and in case the gesture information is received through the raw data, the gesture information is received through the HEC.

Advantageous Effects

According to a method for transmitting and receiving data by using HDMI according to one embodiment of the present invention is capable of transmitting and receiving data between a sink device and a source device.

Also, according to the present invention, bilateral communication is made possible, by which a source device and a sink device may transmit and receive motion information to and from each other.

Also, according to the present invention, motion data and/or motion information may be transmitted to a source device through a sink device equipped with a capture device.

Also, according to the present invention, a sink device not equipped with a capture device may transmit motion data and/or motion information through a source device equipped with a capture device.

The advantageous effects that may be obtained from the present invention are not limited to the effects described above, but other advantageous effects not mentioned above may be clearly understood by those skilled in the art to which the present invention belongs.

BRIEF DESCRIPTION OF THE DRAWINGS

FIG. 1 illustrates an HDMI system and data transmission and reception channels included in the HDMI system according to one embodiment of the present invention.

FIG. 2 illustrates a source device and a sink device in a HDMI system according to an embodiment of the present invention.

FIG. 3 illustrates an EDID structure according to an embodiment of the present invention.

FIGS. 4 to 5 illustrate an embodiment of an EDID extension block.

FIG. 6 illustrates an HF (HDMI Forum)-VSDB (Vendor-Specific Data Block) according to an embodiment of the present invention.

FIG. 7 illustrates an SCDC (Status and Control Data Channel) structure according to an embodiment of the present invention.

FIG. 8 illustrates an HDMI system using a CEC channel according to an embodiment of the present invention.

FIGS. 9 and 10 illustrate a structure of a CEC message according to an embodiment of the present invention.

FIG. 11 illustrates a method for transmitting and receiving data through HDMI according to an embodiment of the present invention.

FIG. 12 illustrates a method for transmitting and receiving data through HEAC (HDMI Ethernet Audio Channel) of HDMI according to an embodiment of the present invention.

FIG. 13 illustrates state transition of a HEC channel and a CEC (Capability Discovery and Control) message according to an embodiment of the present invention.

FIG. 14 illustrates a MAC frame format according to an embodiment of the present invention.

FIG. 15 illustrates one example of gesture information according to an embodiment of the present invention.

FIG. 16 illustrates a method for transmitting and receiving A/V data according to an embodiment of the present invention.

FIG. 17 illustrates a method for transmitting gesture information through CEC (Consumer Electronics Control) in case a sink device according to an embodiment of the present invention supports a camera.

FIG. 18 illustrates a method for transmitting gesture information through CEC (Consumer Electronics Control) in case a source device according to an embodiment of the present invention supports a camera.

FIG. 19 illustrates a method for transmitting gesture information through HEC (HDMI Ethernet Channel) in case a sink device according to an embodiment of the present invention supports a camera.

FIG. 20 illustrates a method for transmitting gesture information through HEC (HDMI Ethernet Channel) in case a source device according to an embodiment of the present invention supports a camera.

FIG. 21 illustrates a method for checking whether a source device according to the present invention is capable of processing gesture information of a sink device through EDID.

FIG. 22 illustrates HF-VSDB according to another embodiment of the present invention.

FIG. 23 illustrates a method for checking whether a sink device according to the present invention is capable of processing gesture information of a source device through SCDCS.

FIG. 24 illustrates a method for transmitting and receiving gesture information of a source device through CEC (Consumer Electronics Control) according to a yet another embodiment of the present invention.

FIG. 25 illustrates a method for transmitting and receiving gesture information of a sink device through CEC (Consumer Electronics Control) according to a still another embodiment of the present invention.

FIG. 26 illustrates a method for transmitting and receiving gesture information of a sink device through HEC (HDMI Ethernet Channel) according to a further embodiment of the present invention.

FIG. 27 illustrates a method for transmitting and receiving gesture information of a source device through HEC (HDMI Ethernet Channel) according to an additional embodiment of the present invention.

FIG. 28 illustrates a method for transmitting and receiving gesture information according to a yet even another embodiment of the present invention.

FIGS. 29 and 30 illustrate a structure of a CEC (Consumer Electronics Control) command according to an embodiment of the present invention.

FIGS. 31 and 32 illustrate a data structure for the case in which gesture information is transmitted through HEC (HDMI Ethernet Channel) according to an embodiment of the present invention.

MODE FOR INVENTION

The aforementioned objects, features and advantages of the present invention will become more apparent through the following detailed description with respect to the accompanying drawings. However, since the present invention may be modified in various ways, and various embodiments may be implemented according to the present invention, specific embodiments will be illustrated with reference to accompanying drawings and will be detailed. Hereinafter, like numbers refer to like elements throughout the specification unless otherwise stated. In describing the present invention, if it is determined that a detailed description of a known function or structure associated with the present invention unnecessarily obscures the gist of the present invention, the detailed description thereof will be omitted.

Hereinafter, a method and an apparatus related to the present invention will be described in detail with reference to the accompanying drawings. The suffixes such as 'module' and 'unit' used in the following description for referring to constituting elements of the present invention are assigned or used interchangeably merely to facilitate writing this document, and do not have specific implications or functions distinguished from each other.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TMDS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present invention.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, video encoding unit (video encoder) 2130, control unit 2140, HDMI transmitter 2150, memory unit 2160, storage unit 2170, multimedia unit 2180, or power supply unit 2190. The sink device 2200 can include at least one of an EDID EEPROM 2210, video decoding unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit to the sink device 2200. The source device 2100 can send a request message to the sink device; or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of the control unit.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device, sink device, and sub-units belonging to the source and sink devices.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The video encoding unit 2130 compresses video data to be transmitted through the HDMI transmitter 2150.

The HDMI receiver 2250 is the unit that is installed in the sink device 2200 and transmits and receives data through HDMI. The HDMI receiver 2250 transmits and receives data including a command between device The video decoding unit 2130 performs decompression of compressed video data received through the HDMI receiver 2250.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information about display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types; among the four pins, only the pin 11, 12, and 4 have been actually used, and 7 types of monitor types could be recognized. The following provide DDC specifications for the respective versions.

DDC version 1 (approved in 1994)
    EDID (Extended Display Identification Data) is defined, which is a binary file format specifying monitoring information.
    Pin 12 is used as a data line, and an EDID block of 128 byte is transmitted consecutively from a monitor to a computer.

DDC version 2 (approved in 1996)
    EDID is no longer defined by the DDC, but specified separately as a companion standard.
    DDC version 2 is based on I2C serial bus. Pin 12 is now used as the data line, and pin 15 is used as the clock line of I2C bus.
    Pin 9 is used to supply 5V DC power (up to 50 mA) from the computer to the monitor to read the EDID stored in the EEPROM even if the monitor is powered off.
    DDC version 2 uses an 8 bit data offset and supports the EDID storage capacity ranging from 28 bytes to 256 bytes.

E-DDC
    E-DDC replaces the DDC version 1 and 2, and version 1 was introduced in 1999. To use E-EDID (Enhanced EDID), the E-DDC allows up to 32 Kbytes of display information storage capacity.
    By employing a new I2C addressing scheme based on 8-bit segment index (0x00~0x7F), 128 segments (1 segment=256 bytes) can be accessed, by which up to 32 bytes can be accessed.
    E-DDC version 1.1 was approved in 2004, which supports a video interface such as HDMI in addition to CE devices and VGA.

E-DDC version 1.2 was approved in 2007, which supports display port and display ID In what follows, EDID provided through the DDC will be described.

FIG. 3 illustrates an EDID structure according to an embodiment of the present invention.

EDID is a data structure containing various types of information about the display device defined in the VESA and can be transmitted to the source device through the DDC channel or read by the source device. In the case of EDID, the data structure of version 1.3 has been used in the IT display device, CE display device, and video interface (HDMI).

FIG. 3 shows an overview of the information represented by the respective addresses in the EDID data structure.

FIGS. 4 to 5 illustrate an embodiment of an EDID extension block.

FIG. 4 illustrates an EDID extension block, FIG. 5(a) a video data block, FIG. 5(b) an audio data block, and FIG. 5(c) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 5(a), the short video descriptor represents the video identification code defined in the CEA-861. In the audio data block of FIG. 5(b), the short audio descriptor represents the audio format code defined in the CEA-861. In the speaker allocation data block of FIG. 5(c), the speaker allocation data block descriptor represents the data block payload defined in the CEA-861.

FIG. 6 illustrates an HF (HDMI Forum)-VSDB (Vendor-Specific Data Block) according to an embodiment of the present invention.

The HF-VSDB shown in FIG. 6 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 6 are described as follows.

Length field: represents the total length of the data block, of which the minimum value is 7, and the maximum value is 31.

IEEE OUI field: refers to IEEE Organizationally Unique Identifier, and the OUI assigned to the HDMI forum is 0xC45DD8.

Version field: represents the version number of the HF-VSDB (HDMI Forum-VSDB), of which the value is 1.

Max_TMDS_Character_Rate field: represents the maximum TMDS character rate supported. If the sink device does not support the maximum TMDS character rate more than 340 Mcsc, it is set to 0; otherwise, it is set to 1.

3D_OSD_Disparity: when this field is set to 1, it indicates that the sink device supports reception of 3D_OSD_Disparity Indication.

Dual_view: when this field is set to 1, it indicates that the sink device supports reception of dual_view signaling.

Independent_view field: when this field is set to 1, it indicates that the sink device supports reception of 3D independent view signaling.

LTE_340Mcsc_scramble field: when this field is set to 1, it indicates that the sink device supports scrambling when the TMDS character rate is less than 340 Mcsc. And when the SCDC_Present is set to 0, this field also has to be set to 0.

RR_Capable field: when this field is set to 1, it indicates that the sink device can initiate an SCDC read request. And if the SCDC_Present is set to 0, this field also has to be set to 0.

SCDC_Present field: when this field is set to 1, it indicates that the sink device supports the SCDC function.

DC_48 bit_420, DC_36 bit_420, DC_30 bit_420: when these fields are set to 1, it indicates that deep color 4:2:0 pixel encoding is supported by 10 bit/12 bit/16 bit per component.

The present invention is capable of signaling decompression capability information of the sink device through an HF-VSDB of the EDID, which will be described later.

FIG. 7 illustrates an SCDC (Status and Control Data Channel) structure according to an embodiment of the present invention.

The SCDC (Status and Control Data Channel) corresponds to a point-to-point communication protocol based on which the source device and the sink device exchange data with each other. The SCDC communication can use the aforementioned DDC channel (I2C line). In other words, the SCDC is a one-to-one communication protocol based on the I2C serial communication that enables HDMI source devices and sink devices to exchange data among them. The SCDC includes a mechanism in which the sink device, an I2C slave, requests status check read from the source device, an I2C master, and the source device receiving the request reads the corresponding status from the sink device.

The SCDCS (SCDC Structure) can be stored in the memory of the sink device and include data having the structure as shown in FIG. 7. In FIG. 7, R/W indicates whether the source device can only read or read/write the SCDCS data stored in the sink device.

The fields included in the SCDCS of FIG. 8 are described below.

Sink Version field: provides version information of an SCDCS compliant sink device.

Source Version field: when the SCDCS compliant sink device reads E-EDID from the sink device, and the SCDC_Present of the E-EDID is set to 1, the source version of the SCDCS is set to 1.

Update Flags (Update_0, Update_1) field: when there is a change in the information that the sink device has to inform of the source device (Status, Character Error Detect, and so on), the corresponding bit is set to 1.

TMDS Configuration (TMDS_Config) field: each of the TMDS_Bit_Clock_Ratio and Scrambling_Enable occupies one bit, and if the source device attempts to activate the scrambling function of the sink device, the corresponding bit is set to 1. If the TMDS_Bit_Clock_Ratio is 1/10, this field is set to 0 while it is set to 1 in the case of 1/40.

Scrambler Status field: when the sink device detects a scrambled control code sequence, the corresponding bit is set to 1.

Configuration (Config_0) field: this field is used to configure capability-related information of the source and the sink device. Currently, this field provides only the RR_Enable field that indicates whether the source device supports a read request of the sink device.

Status Flags (Status_Flag_0, Status_Flag_1) field: indicates whether data received through the clock, channel 0, 1, and 2 have been decoded successfully.

Err_Det_0~2_L/H field: represent the LSB and MSB of the error counter detected in the channel 0 to 3.

Err_Det_Checksum field: is implemented so that one byte sum of error detection values of seven registers including checksum becomes 0.

FIG. 8 illustrates an HDMI system using a CEC channel according to an embodiment of the present invention.

HDMI CEC stands for HDMI Consumer Electronics Control, and as described earlier, it refers to the protocol designed for a network in which a plurality of multimedia products are connected to each other via an HDMI cable to allow a user to control various products simultaneously through a single operation. In what follows, it will be called HDMI CEC.

As shown in FIG. 8, an HDMI CEC system largely comprises an HDMI sink device 1020 and an HDMI source device 1010; and the sink device 1020 may include an HDMI connector, HDMI receiver, CPU (Central Processing Unit), and CEC converter while the source device 1010 may include an HDMI connector, HDMI transmitter, CPU, and CEC converter.

In various embodiment to which the present invention may be applied, depending on situations, the sink device 1020 may be called a receiver or an initiator while the source device 1010 may be called a transmitter or a follower.

At this time, an initiator may denote a device which initiates, delivers, and controls a command while a follower may denote a device which responds to a command, operates according to a request, and informs of the result after the operation.

The sink device 1020 may include a TV and a repeater while the source device 1010 may include a DVD player, set-top box (STB), personal computer, notebook, and recorder.

The HDMI connector may include five types of connectors such as type A, B, C, D, and E. For example, type A may refer to an ordinary 19 pin HDMI connector, type B may refer to a 29 pin connector designed for transmitting UHD video, type C may refer to a 19 pin mini-connector, type D may refer to a 19 pin micro-connector, and type E may refer to a connector for vehicles.

As described above, an HDMI transmitter and an HDMI receiver may include three TMDS (Transition Minimized Differential Signaling) data transmission channels which transmit multimedia information through an HDMI connector and control channels such as a clock channel, DDC (Display Data Channel) (not shown in the figure), CEC (Consumer Electronics Control) channel, utility channel (not shown in the figure), HPD (Hot Plug Detect) channel (not shown in the figure).

The TMDS channel comprises three data transmission channels and transmits video and audio data.

The CEC channel is a control channel delivering a CEC protocol which is a set of control commands by which devices connected through HDMI may be controlled by a TV remote controller. The CEC channel enables one touch play, by which a user may play various device connected through HDMI by using a TV remote controller without resorting to separate control of the devices, thereby improving user convenience.

The CPU of the sink device 1020 may include a graphic user interface (GUI) layer, application layer, and CEC protocol layer while the CPU of the source device 1010 may include an application layer and CEC protocol layer.

The GUI layer processes data received through HDMI receiver and outputs the processed data through a graphic user interface, the application layer processes data according to a method defined by the user, and the CEC protocol layer processes received CEC data and delivers required information to a upper layer. The CEC protocol layer may perform physical address allocation and logical address allocation to which the present invention is applied.

The CEC converter of the sink device 1020 and the source device 1010 may generate a signal for data transmission or manages re-transmission for reliable transmission, for example, frame transmission, line error handling, and frame validation. Also, the CEC converter performs the role of an interface which processes an HDMI CEC signal through data communication with the CPU in frame units.

For example, the signal processing unit to which the present invention is applied may perform the role of processing a command, request, action, or response message or data between devices.

FIGS. 9 and 10 illustrate a structure of a CEC message according to an embodiment of the present invention.

As described above, the CEC enables the user to control a CEC-enabled device connected through HDMI by using a remote controller. When connected to each other through HDMI, physical addresses are assigned to the respective devices, and logical addresses are additionally assigned to CEC-enabled devices.

Each individual device may exchange messages through a CEC line at the occurrence of an event, and each message may be used to perform the following functions.

One Touch Play: play of a device is started by one click of a button, and the device enters an active source state.

Routing Control: controls routing of an HDMI network when a CEC switch is being used.

System Standby: switches all the connected devices to a standby mode.

One Touch Record: controls a function of recording the contents played in TV.

Preset Transfer: transfers a channel setting to a different TV set.

Timer Programming: programs a timer of a different device from one device.

System Information: sets a device to use the same OSD and a menu language as TV.

Deck Control: controls a play device from a different device.

Tuner Control: controls a tuner of a different device.

OSD display: transfer text so that a device may display the screen shown in a TV set.

Device OSD Name Transfer: transfers a predetermined device name to a TV set.

Device Menu Control: enables a TV remote controller to control menus of a device.

Remote Control Pass Through: transfers what has been received from a remote controller to a different device.

Vendor Specific Commands: commands defined by a manufacturer.

A CEC message may be transmitted through a CEC frame, and a CEC frame may comprise a start bit, a header block, a first data block, and a second data block as shown in FIG. 9.

The size of each block is 10 bits, and the size of the largest message excluding the start bit is 16*10 bits.

As shown in FIGS. 9(c) and 10, the header block may include address of a source device and destination address, the first data block may comprise an opcode block, and the second data block may comprise an operand block. At this time, an opcode may denote the name used for identifying a message.

Each data block and header block may comprise an information bits field, EOM (End Of Message) field, and ACK field.

The information bits field may include data, opcode, or address. The EOM (End Of Message) field indicates the last block of a message; for example, if the EOM field is 0, it indicates existence of one or more data blocks while, if the EOM field is 1, it indicates that a message is completed. Even if a message contains additional data after the EOM field is transmitted, a device has to ignore the additional data.

The ACK field is sent by being set to '1' by the initiator, and the follower indicates reception of a message by setting the ACK field to '0'.

FIG. 11 illustrates a method for transmitting and receiving data through HDMI according to an embodiment of the present invention.

If the source device 1010 and the sink device 1020 are connected to each other through an HDMI cable, the source device 1010 changes the power line from low level to high level and applies a current S11010. Subsequent to the aforementioned operation, the source device 1010 may operate the EEPROM in which EDID information of the sink device 1020 is stored and related circuit.

The sink device 1020 switches the HPD (Hot Plug Detect) line from low to high level to inform the source device 1010 of the fact that a cable has been connected properly and EDID information may be accessible as EDID-related circuit has been activated S11020.

Afterwards, the source device 1010 may transmit an EDID information read request to the sink device 1020 through DDC S11030. In response to the EDID read request, the sink device 1020 may transmit the EDID information stored in the EEPROM through the DDC S11040. In the embodiment of the present invention, the EDID information may be transmitted being included in the aforementioned VSDB.

The source device 1010 and the sink device 1020 perform an encryption protocol according to a HDCP (High-bandwidth Digital Content Protection) key exchange procedure through the DDC S11050.

The sink device 1020 transmits <Give Deck Status> ["on"] message to the source device 1010, which is a CEC message for turning on the deck of the sink device 1020, S11060. By turning on the deck and transmitting a <Deck Status> message, the source device 1010 may inform the sink device 1020 of the deck status of the source device 1010, S11070.

Afterwards, if the sink device 1020 receives a command for playing A/V data from the user, the sink device 1020 may make the source device 1010 play A/V data by transmitting <Play> through the CEC S11080. By transmitting a <Deck Status>["Play"] message to the sink device 1020 through the CEC, the source device may inform that the deck of the source device 1010 is being played S11090.

Afterwards, the source device 1010 may transmit video data, audio data, and infoframe to the sink device 1020 through the TMDS S11100. Receiving a specific command, for example, Next Chapter command from the user, the sink device 1020 may make the source device 1010 skip the current chapter by transmitting a <Dec Control>["Skip Forward"] message through the CEC S11110. The source device 1010 which has skipped the current chapter may report the deck status by transmitting a <Deck Status>["Skip Forward"] message S11120.

Afterwards, the source device may transmit video data, audio data and/or infoframe to the sink device 1010 through the TDMS S11130.

The present invention proposes a method for transmitting and receiving gesture information obtained from a capture device through a method for transmitting and receiving data by using HDMI.

FIG. 12 illustrates a method for transmitting and receiving data through HEAC (HDMI Ethernet Audio Channel) of HDMI according to an embodiment of the present invention.

HEAC stands for HDMI Ethernet Audio Channel. In the specification of the HEAC, Ethernet complies with the IEEE 802.3 specification, and audio data comply with the IEC60958-1 specification.

Pin 14 is assigned to utility/HEAC+ (optional, HDMI 1.4+ with an audio return channel and Ethernet), pin 17 is DDC/CEC/HEC ground, and pin 19 is HEAC− (optional, HDMI 1.4+ with an audio return channel and Ethernet).

As shown in FIG. 12, the HEC manages Ethernet connectivity of HDMI, supporting full duplex mode and 100 Mbps network speed by using a 100 base-tx type cable.

The HEC network consists of a sink device, repeater, and source device connected to each other though HEAC cables, and a repeater or a source device equipped with at least two HEC connectors has internal layer 2 switch (L2SW) for forwarding the MAC frame.

ARC stands for Audio Return Channel and may apply a digital sound signal transmitted to a source device through a sink device, for example, TV through a repeater inversely to the repeater, for example, an A/V amp via the HDMI. Therefore, a TV transmitting an audio signal becomes a source device, and which audio format the amp supports may be checked by using the CEC.

FIG. 13 illustrates state transition of a HEC channel and a CEC (Capability Discovery and Control) message according to an embodiment of the present invention.

An HEC channel is controlled by a CEC message, and at this time, a CEC command which controls the HEC state is called HEC CDC (Capability Discovery and Control).

The HEC may have the following states:
Potential HEC: the initial connected state (PHEC),
Verified HEC: the state in which support of HEC function has been verified (VHEC), and
Active HEC: the state in which HEC function has been activated (AHEC).

The HEC CDC is transmitted through the CEC and may discover an HDEC in the Potential HEC state.

Also, the HEC CDC may activate or deactivate an HEC and deliver channel status.

As shown in FIG. 13, if HDMI is connected for the first time, the HEC state of a device becomes the Potential HEC (PHEC) state. A device to which HDMI is connected may transmit <CDC_HEC_Discover> message to discover HEC capability of a different device connected by HDMI S13010.

If a different device which has received the <CDC_HEC_Discover> message supports HEC function, the different device may transmit <CDC_HEC_ReportState> message in response to the <CDC_HEC_Discover> message.

However, in case a different device which has received the <CDC_HEC_Discover> message does not support HEC function, the different device does not respond to the <CDC_DEC_Discover> message.

Through the method above, the device may check whether a different device connected by HDMI supports HEC function or not.

In case the <CDC_HEC_ReportState> message transmitted from a different device indicates an inactivation state, the device may transmit <CEC_HEC_SetState> message to the different device to activate the HEC.

The different device which receives the <CEC_HEC_SetState> message may activate all of HECs between the device and the different device and transmit <CEC_HEC_ReportState> message to the device to report activation state of HEC S13020.

Afterwards, the device may transmit <CDC_HEC_SetState> message to deactivate the HEC in the activation state S13050.

The different device which receives the <CDC_HEC_SetState> message may deactivate all of the HECs between the device and the different device.

In case part of devices in the VHEC state does not support the HEC function, those devices not supporting the HEC function may return to the PHEC state S13040.

FIG. 13(b) illustrates the CDC message frame structure, and the CDC message may comprise a start bit field, CEC header block field, CEC opcode block field, CEC initiator physical address field, CDC opcode field and/or CDC parameter field.

Since the start bit field, CEC header block field, CEC opcode block field, and CEC initiator physical address field are the same as illustrated in FIGS. 9 and 10, descriptions thereof will be omitted.

The CDC opcode field indicates to which message the CDC message corresponds, and the CDC parameter field may include parameters of each CDC message.

The present invention proposes a method for transmitting and receiving data obtained by a capture device through the HEC described above.

FIG. 14 illustrates a MAC frame format according to an embodiment of the present invention.

FIG. 14 illustrates the structure of the MAC frame forwarded through the HEC described above, where data may be delivered by using the MAC data frame (IEEE 802.3).

The present invention proposes a method for transmitting data obtained from a capture device by a sink device or a source device to the source device or sink device through HEC by using the MAC frame.

FIG. 15 illustrates one example of gesture information according to an embodiment of the present invention.

Devices equipped with a capture device (for example, camera or camcorder) may recognize or extract a predetermined gesture from video or images captured through the capture device.

The gestures recognized or extracted as described above are called gesture information. The aforementioned gesture information basically includes (a) face information, hand information, body information of a human, or a combination of the aforementioned information.

(b) The information about a human face may be obtained by using a technology such as face detection, face recognition, face part tracking, or gaze tracking.

(c) The hand or body information may include hand gesture representing motion, position, or shape of a hand; finger gesture representing motion, position, or shape of a finger; and body gesture representing motion, position, or shape of a body.

At this time, in order for the sink device or the source device to recognize or extract specific information such as the gesture information from the video or the image, the source device or the sink device needs to be informed beforehand about which information the gesture information describes. In other words, the source device or the sink device has to be informed of specific technology or information beforehand to recognize or extract the gesture information.

The gesture information may be transmitted as raw data such as the video or the image; or as metadata representing the gesture information in the raw data.

For example, the metadata may represent x-axis information, y-axis information, or coordinates such as width and height. The metadata consist of simple, small amount of data, being convenient for transmission and reception.

The raw data are YUV video or image expressing color by using a brightness signal (Y) and chrominance signals (U, V) captured by a capture device; and it is sufficient to have only the brightness signal (Y) to extract metadata from the raw data.

The present invention proposes a method for transmitting the aforementioned gesture information to a sink device or a source device through HDMI.

FIG. 16 illustrates a method for transmitting and receiving A/V data according to an embodiment of the present invention.

With reference to FIG. 16, a sink device and a source device may transmit and receive A/V data through HDMI.

More specifically, the source device 1010 and the sink device 1020 are connected to each other through an HDMI cable S16010. After an HDMI cable is connected, the source device 1010 switches a 5V power line from low level to high level and applies a current S16020. Through this operation, the source device 1010 may operate EEPROM which stores EDID information of the sink device 1020 and related circuit.

The sink device 1020 switches the HPD (Hot Plug Detect) line from low to high level S16030 to inform the source device 1010 of the fact that a cable has been connected properly and EDID information may be accessible as EDID-related circuit has been activated.

Now, the source device 1010 may transmit an EDID information read request to the sink device 1020 through DDC S16040. In response to the EDID read request from the source device 1010, the sink device 1020 may transmit the EDID information stored in the EEPROM through the DDC S16050. In the embodiment of the present invention, the EDID information may be transmitted being included in the aforementioned VSDB.

The source device 1010 may determine operation parameters (timing, format, and so on) of A/V data to be transmitted to the sink device 1020 by parsing the received EDID information S16060 and transmit to the source device determined operation parameters related to uncompressed A/V data to be transmitted.

The method illustrated in FIG. 16 is intended for transmitting and receiving A/V data stored in a source device, but it may not be used for transmitting and receiving video or image data obtained from a capture device (for example, camera or camcorder) installed in the source device or sink device, or may not be used for transmitting and receiving gesture information included in the video or image data.

Therefore, the present invention proposes a method for transmitting and receiving not only video or image data obtained from a capture device but also gesture information obtained from the video or image data through HDMI.

FIG. 17 illustrates a method for transmitting gesture information through CEC (Consumer Electronics Control)

in case a sink device according to an embodiment of the present invention supports a camera.

With reference to FIG. 17, in case a sink device is equipped with a camera, data captured from the installed camera (video or image data) or gesture information included in the data may be transmitted to a source device through HDMI.

More specifically, the sink device may transmit an EDID information read request through DDC in case the sink device is connected to the source device by an HDMI cable S17010. In response to the EDID read request, the sink device may receive the EDID information stored in the EEPROM from the source device through the DDC S17020. In the embodiment of the present invention, the EDID information may be transmitted being included in the aforementioned VSDB.

The EDID may include capability information of the source device related to the gesture information described with reference to FIG. 15.

The capability information may indicate whether a source device is capable of processing gesture information and include information about whether the source device supports a service related to the gesture information or the source device is capable of processing raw data which may be video or image data containing the gesture information.

The sink device may determine whether the source device is capable of processing gesture information by parsing the EDID information received from the source device.

In case the source device is incapable of processing the gesture information, the sink device does not transmit the gesture information to the source device but may transmit only the data S17070.

However, in case the source device is capable of processing the gesture information, the sink device may receive a request for transmitting gesture information through CEC from the source device S17030.

The sink device which has received the gesture information may obtain gesture information from a camera installed in the sink device S17040 and transmit the gesture information obtained through CEC to the source device S17050.

Lastly, the source device may process the received gesture information S17060.

FIG. 18 illustrates a method for transmitting gesture information through CEC (Consumer Electronics Control) in case a source device according to an embodiment of the present invention supports a camera.

With reference to FIG. 18, in case a source device is equipped with a camera, data (video or image data) captured by the camera or gesture information included in the data may be transmitted to a sink device through HDMI.

More specifically, if the source device is connected to the sink device through an HDMI cable S18010, the source device may transmit an EDID information read request to the sink device and receive the EDID stored in the EEPROM from the sink device through DDC in response to the EDID information read request S18020. In the embodiment of the present invention, the EDID information may be transmitted being included in the aforementioned VSDB.

The EDID may include capability information of the sink device related to the gesture information described with reference to FIG. 15.

The capability information may indicate whether a sink device is capable of processing gesture information and include information about whether the sink device supports a service related to the gesture information or the source device is capable of processing raw data which may be video or image data containing the gesture information.

The source device may determine whether the sink device is capable of processing gesture information by parsing the EDID information received from the sink device.

Afterwards, the source device may request the sink device to write capability information related to the gesture information of the source device into the SCDCS of the sink device.

The source device and the sink device may determine whether the sink device and the source device are capable of processing gesture information through reading the EDID and SCDCS.

In case the source and the sink device are incapable of processing the gesture information, the source device does not transmit the gesture information to the sink device but may transmit only the data S18080.

However, in case the source device is capable of processing the gesture information, the source device may receive a request for transmitting gesture information through CEC from the sink device S18040.

The source device which has received the gesture information may obtain gesture information from a camera installed in the sink device S18050 and transmit the obtained gesture information to the source device through CEC S18060.

Lastly, the sink device may process the received gesture information S18070.

FIG. 19 illustrates a method for transmitting gesture information through HEC (HDMI Ethernet Channel) in case a sink device according to an embodiment of the present invention supports a camera.

First, since S19010 and S19020 steps are the same as S17010 and S17020 steps of FIG. 17, descriptions thereof will not be repeated. FIG. 19 includes operations additional to the steps of FIG. 17; descriptions for the same steps appearing in FIGS. 17 and 19 will not be repeated; however, the descriptions may be applied to FIG. 19 in the same manner as in FIG. 17.

As shown in FIG. 19, the sink device may determine whether the source device is capable of processing gesture information by parsing the EDID information received from the source device.

In case the source device is incapable of processing the gesture information, the sink device does not transmit the gesture information to the source device but may transmit only the data S19090.

However, in case the source device is capable of processing the gesture information, the sink device checks whether HEC has been activated or deactivated for the source device S19030; in case the HEC has been deactivated, the sink device activates the HEC as described in FIG. 13, S19040.

Afterwards, the sink device may receive a request for transmitting gesture information from the source device through HEC S19050.

The sink device which has received the request for gesture information may obtain gesture information from a camera installed in the sink device S19060 and transmit the obtained gesture information to the source device through HEC S19070.

Lastly, the source device may process the received gesture information S19080.

FIG. 20 illustrates a method for transmitting gesture information through HEC (HDMI Ethernet Channel) in case a source device according to an embodiment of the present invention supports a camera.

First, since S20010 and S20030 steps are the same as S18010 and S18030 steps of FIG. 18, descriptions thereof will not be repeated. FIG. 20 includes operations additional to the steps of FIG. 18; descriptions for the same steps appearing in FIGS. 18 and 20 will not be repeated; however, the descriptions may be applied to FIG. 20 in the same manner as in FIG. 18.

As shown in FIG. 20, in case the source device is incapable of processing the gesture information, the source device does not transmit the gesture information to the sink device but may transmit only the data S20100.

However, in case the source device is capable of processing the gesture information, the source device checks whether HEC has been activated or deactivated for the sink device S20040; in case the HEC has been deactivated, the source device activates the HEC as described in FIG. 13, S20050.

Afterwards, the source device may receive a request for transmitting gesture information from the sink device through HEC S20060.

The source device which has received the request for gesture information may obtain gesture information from a camera installed in the source device S20070 and transmit the obtained gesture information to the sink device through HEC S20090.

Lastly, the source device may process the received gesture information S20090.

FIG. 21 illustrates a method for checking whether a source device according to the present invention is capable of processing gesture information of a sink device through EDID.

With reference to FIG. 21, in case the sink device is equipped with a camera, whether the sink device is capable of processing gesture information may be checked by reading EDID.

More specifically, the source device 1010 may determine whether the sink device 1020 is capable of processing gesture information by reading the EDID of the sink device 1020, S21010.

In other words, the source device 1010 may transmit an EDID information read request to the sink device 1020, and the sink device 1020 may transmit EDID including capability information related to whether the sink device is capable of processing the gesture information to the source device 1010 in response to the request.

The EDID information according to an embodiment of the present invention may be transmitted as the VSDB described above, which will be described with reference to FIG. 22.

The source device 1010 which has received the EDID may interpret the EDID to check whether the sink device 1020 is capable of processing gesture information, for example, whether the sink device 1020 is capable of processing gesture information and/or whether the sink device 1020 is capable of processing the data described above S21020.

In case the sink device 1020 is capable of processing gesture information, the source device may request gesture information from the sink device S21030 and receive the gesture information from the sink device 1020.

FIG. 22 illustrates HF-VSDB according to another embodiment of the present invention.

FIG. 22 describes an embodiment which further includes capability information related to gesture information processing in addition to the HF-VSDB described in FIG. 6. The HF-VSDB of FIG. 22 is one embodiment of EDID information described above; and may include capability information and fields indicating capability of processing gesture information and raw data including the gesture information.

FIG. 22 defines a new HF-VSDB, in which the version number in the Version field may be set to 2 to distinguish the new HF-VSDB from the previous version. To indicate that a sink device is capable of processing compressed A/V data, at least one bit from among bit 5 to 4 of byte 6 block and bit 7 to 3 of byte 7 block of the HF-VSDB may be used.

In the present embodiment, if the corresponding bit is set to 1, it may indicate that a sink device may receive gesture information while, if the corresponding bit is set to 0, it may indicate that the sink device may not receive gesture information.

In what follows, descriptions of fields about newly added decompression capability information will be given. The decompression capability information may include at least one of the following fields described with reference to FIG. 15.

Gesture_Present field: indicates whether a sink device is capable of processing gesture information.

Gesture_Capable field: indicates whether a sink device is capable of processing data including gesture information.

In this manner, the HF-VSDB may be used in an embodiment of the present invention for determining a sink device's capability of processing gesture information through EDID.

FIG. 23 illustrates a method for checking whether a sink device according to the present invention is capable of processing gesture information of a source device through SCDCS.

With reference to FIG. 23, in case a source device supports a camera, the source device may write the source device's capability of processing gesture information through SCDC, and the sink device may check whether the source device is capable of processing gesture information by reading the SCDC.

First, since S23010 step is the same as S22010 step of FIG. 22, description thereof will be omitted.

As shown in FIG. 23, by using the information read from the Gesture_Present field of the EDID transmitted from the sink device 1020, the source device 1010 may request the sink device 1020 to write "1" into the RR_Enable field of the SCDCS of the sink device in case a read request is supported, but "0" otherwise S23020.

Afterwards, the source device 1010 may request writing to the field of SCDCS of the sink device related to processing of gesture information of the source device 1010, S23030.

As shown in FIG. 23(a), an embodiment of fields corresponding to/being included in the capability information related to gesture information processing and descriptions thereof will be given below.

Gesture_Enable: it is set to "1" if a source device is capable of processing gesture information, but it is set to "0", otherwise.

Gesture_Handling: it is set to "1" if a source device is capable of processing raw data including gesture information, but it is set to "0", otherwise (if it is set to "0", Gesture_Handling may be transmitted in the form of metadata only).

The sink device 1020 may determine whether the source device is capable of processing gesture information by reading the information written to the SCDCS, and if it is found that the source device is capable of processing gesture information, the sink device may request gesture information from the source device 1010, S23050.

At this time, if Gesture_Handling field of the SCDCS is set to "0", the sink device may receive only metadata, but if it is set to "1", the sink device may receive metadata and/or raw data.

FIG. 24 illustrates a method for transmitting and receiving gesture information of a source device through CEC (Consumer Electronics Control) according to a yet another embodiment of the present invention.

With reference to FIG. 24, in case a sink device is capable of processing gesture information, the sink device may transmit gesture information to a source device through CEC.

More specifically, through the process described with reference to FIGS. 21 to 23, the source device 1010 may determine whether the sink device 1020 is capable of processing gesture information.

Afterwards, upon request of a user, the source device 1010 may request gesture information from the sink device 1020 through a CEC message requesting gesture information such as <Request Gesture capability> S24010.

The sink device 1020 which has received the request may transmit gesture information by including it in the Operand field of a CEC message such as <Response Gesture Data capability>[capability] in response to the request S24020.

FIG. 25 illustrates a method for transmitting and receiving gesture information of a sink device through CEC (Consumer Electronics Control) according to a still another embodiment of the present invention.

With reference to FIG. 25, in case a source device is capable of processing gesture information, the source device may transmit gesture information to a sink device through CEC.

More specifically, through the process described with reference to FIGS. 21 to 23, the sink device 1020 may determine whether the source device 1010 is capable of processing gesture information.

Afterwards, upon request of a user, the sink device 1020 may request gesture information from the source device 1010 through a CEC message requesting gesture information such as <Request Gesture capability> S25010.

The source device 1010 which has received the request may transmit gesture information by including it in the Operand field of a CEC message such as <Response Gesture Data capability>[capability] in response to the request S25020.

FIG. 26 illustrates a method for transmitting and receiving gesture information of a sink device through HEC (HDMI Ethernet Channel) according to a further embodiment of the present invention.

With reference to FIG. 26, in case a sink device is capable of obtaining gesture information, a source device may request the sink device to transmit obtained gesture information and receive gesture information from the sink device through HEC (HEMI Ethernet Channel).

More specifically, a source device 1010 may determine whether a sink device 1020 is capable of processing gesture information through the process of FIGS. 21 to 23. Afterwards, the sink device 1020 may transmit a CEC message such as <CDC_HEC_InquireState> inquiring the state of the HEC as described in FIG. 13 through a CEC message S26010.

At this time, unique physical addresses are required for the source device 1010 and the sink device 1020 to use the CEC and for all of the devices within an HDMI CEC system, on the other hand, to activate an HDMI CEC function.

In case an HDMI host device is a sink device, the sink device 1020 has to perform a physical address allocation mechanism irrespective of whether the CEC function is supported for the HDMI host device while a physical address may not be allocated for other devices if the CEC function is not supported. A physical address may consist of 4 digits.

The sink device 1020 generates a physical address 0.0.0.0 and reads an address from the EDID within the sink device 1020.

And the sink device 1020 has to generate a physical address of a source device 1010 connected to the sink device 1020, and part of the EDID VSDB of the source device may be used for physical addresses.

To generate a physical address of the source device 1010, each time the source device 1010 goes down from the current layer, the next digit value may be increased by 1. In the present invention, the physical address of the source device is assumed to be 1.0.0.0.

The sink device 1020 may receive a CEC message such as <CDC_HEC_ReportState> including information related to the state of the HEC through the CEC in response to the CEC message inquiring the HEC state S26020.

At this time, the <CEC_HEC_ReportState> message may include operands as shown in Table 1 below.

TABLE 1

| Name | Range Description | | Length | Purpose |
|---|---|---|---|---|
| [HEC State] | [HEC Functionality State] [Host Functionality State] [ENC Functionality State] [CEC Error Code] | | 1 byte | |
| [HEC Functionality State] | "HEC Not Supported" | 0 | 2 byte | Indicates that HEC Functionality is not supported |
| | "HEC Inactive" | 1 | | Indicates that HEC Functionality is supported but inactive |
| | "HEC Active" | 2 | | Indicates that HEC Functionality is supported and active |
| | "HEC Activation Field" | 3 | | Indicates that HEC Functionality is supported and active on at least one HDMI port. The activation state of each HDMI port is indicated in the [HEC Activation Field] parameter. This value shall only be used in response to a <CDC_HEC_SetState> message containing multiple VHECs |

TABLE 1-continued

| Name | Range Description | | Length | Purpose | |
|---|---|---|---|---|---|
| [Host Functionality State] | "Host Not Supported" | 0 | 2 bits | Indicates that Host Functionality is not supported | |
| | "Host Inactive" | 1 | | Indicates that Host Functionality is supported but inactive | |
| | "Host Active" | 2 | | Indicates that Host Functionality is supported and active | |
| [ENC Functionality State] | "Ext Con Not Supported" | 0 | 2 bits | Indicates that an External Network Connection is not supported(e.g. no cable connected) | |
| | "Ext Con inactive" | 1 | | Indicates that an External Network Connection is supported but inactive | |
| | "Ext Con Active" | 2 | | Indicates that an External Network Connection is supported and active | |
| [HEC Set State] | "Deactivate HEC" | 0 | 1 byte | Sets the required HEC Functionality state of the HDMI Ethernet Channel | |
| | "Activate HEC" | 1 | | | |
| [Input port number] | Initiator's (Sink's) input Port number | 0 ≤ N ≤ 15 | 4 bits | The value of the nibble of the Initiator's physical address that is different in the directly Follower's physical address. | |
| [CDC_HPD_Error_Code] | "No Error" | 0x0 | 4 bits | | Same |
| | "Initiator does not have the requested Capability" | 0x1 | | The device never support this Capability | Range as [CDC Error |
| | "Initiator is not capable to carry out the request in this state" | 0x2 | | The Device supports this Capability, but is not capable to carry out the request in the current state Note: A Source shall not use this parameter | Code] |
| | "Other Error" | 0x3 | | Another error occurred | |
| | "No Error, No Video Steam" | 0x4 | | "No Error" response with additional indication that the Source is not sending a video stream | |
| | Reserved | 0x5-0xf | | | |

In case the HEC is inactive, the sink device 1020 may transmit a CEC message such as <CDC_HEC_SetState> to the source device 1010 through the CEC S26030 and activate all of HECs between the sink device 1020 and the source device 1010.

After the HEC is activated through the CEC message, the source device 1010 may transmit a CEC message such as <CDC_HEC_ReportState> including state information of the HEC to the sink device to inform the sink device 1020 that the HEC has been activated S26040.

However, if the HEC is activated, the S26030 and the S26040 steps may not be performed.

Afterwards, the source device 1010 may request gesture information described with reference to FIG. 15 from the sink device 1020, S26050.

The sink device 1020 which has received the request for gesture information may transmit type of gesture information that the sink device 1020 supports and transmit the gesture information obtained from the camera to the source device 1010, S26080.

At this time, the S26050 to S26080 steps may be performed through a CEC channel or HEC, and the gesture information may be transmitted in the form of raw data, which is video or image data obtained by the camera, or metadata.

FIG. 27 illustrates a method for transmitting and receiving gesture information of a source device through HEC (HDMI Ethernet Channel) according to an additional embodiment of the present invention.

With reference to FIG. 27, in case a source device is capable of obtaining gesture information, a sink device may request the source device to transmit gesture information and receive gesture information from the source device through HEC (HDMI Ethernet Channel).

More specifically, through the process described with reference to FIGS. 21 to 23, the sink device 1020 may determine whether the source device 1010 is capable of processing gesture information. Afterwards, the source device 1010 may transmit a CEC message such as <CDC_HEC_InquireState> inquiring the state of the HEC described in FIG. 13 to the sink device 1020, S27010.

At this time, unique physical addresses are required for the source device 1010 and the sink device 1020 to use the CEC and for all of the devices within an HDMI CEC system, on the other hand, to activate an HDMI CEC function.

In case an HDMI host device is a sink device, the sink device 1020 has to perform a physical address allocation mechanism irrespective of whether the CEC function is supported for the HDMI host device while a physical address may not be allocated for other devices if the CEC function is not supported. A physical address may consist of 4 digits.

The sink device 1020 generates a physical address 0.0.0.0 and reads an address from the EDID within the sink device 1020.

And the sink device 1020 has to generate a physical address of a source device 1010 connected to the sink device 1020, and part of the EDID VSDB of the source device may be used for physical addresses.

To generate a physical address of the source device 1010, each time the source device 1010 goes down from the current layer, the next digit value may be increased by 1. In the present invention, the physical address of the source device is assumed to be 1.0.0.0.

The source device 1010 may receive a CEC message such as <CDC_HEC_ReportState> including information related to the state of the HEC through the CEC in response to the CEC message inquiring the HEC state S27020.

At this time, the <CEC_HEC_ReportState> message may include operands as shown in Table 1 above.

In case the HEC is inactive, the source device 1010 may transmit a CEC message such as <CDC_HEC_SetState> to the sink device 1020 through the CEC S27030 and activate all of HECs between the source device 1010 and the sink device 1020.

After the HEC is activated through the CEC message, the sink device 1020 may transmit a CEC message such as <CDC_HEC_ReportState> including state information of the HEC to the source device to inform the source device 1010 that the HEC has been activated S27040.

However, if the HEC is activated, the S27030 and the S27040 steps may not be performed.

Afterwards, the sink device 1020 may request gesture information described with reference to FIG. 15 from the source device 1020, S27050.

The source device 1010 which has received the request for gesture information may transmit type of gesture information that the source device 1010 supports and transmit the gesture information obtained from the camera to the sink device 1020, S27080.

At this time, the S27050 to S27080 steps may be performed through a CEC channel or HEC, and the gesture information may be transmitted in the form of raw data, which is video or image data obtained by the camera, or metadata.

FIG. 28 illustrates a method for transmitting and receiving gesture information according to a yet even another embodiment of the present invention.

With reference to FIG. 28, a sink device equipped with a camera may transmit gesture information in the form of raw data or metadata according to whether a source device is capable of processing video or image data including gesture information.

If the source device is connected to the sink device through an HDMI cable S28010, the source device may transmit an EDID information read request to the sink device and receive the EDID stored in the EEPROM from the sink device through DDC in response to the EDID information read request S28020. In the embodiment of the present invention, the EDID information may be transmitted being included in the aforementioned VSDB.

The EDID may include capability information of the source device related to the gesture information described with reference to FIG. 15.

The capability information may indicate whether or not the gesture information can be processed and include information about whether the source device supports a service related to the gesture information or the source device is capable of processing raw data which may be video or image data containing the gesture information.

The sink device may determine whether the source device is capable of processing gesture information by parsing the EDID information received from the source device.

Afterwards, the source device may request the sink device to write capability information related to the gesture information of the source device into the SCDCS of the sink device.

The sink device may determine whether the sink device and the source device are capable of processing gesture information by reading out the SCDCS. In other words, the sink device may check whether the source device is capable of processing gesture information and raw data by reading out the Gesture_Handling field and the Gesture_Enable field of the SCDCS shown in FIG. 23(*a*).

In case the source device is capable of parsing raw data, the sink device may perform the process designated by the user or transmit raw data including gesture information to the source device S28050, and the source device may obtain gesture information by parsing the received raw data s28060.

However, in case the source device is incapable of processing the raw data, the sink device may transmit metadata described with reference to FIG. 15 to the source device through the CEC S28040.

Moreover, even if the source device is capable of processing raw data, in case the user commands to transmit only metadata, the sink device may transmit metadata to the source device through the HEC or CEC. In this case, metadata may be transmitted mostly through the CEC.

In another embodiment, in case the sink device is incapable of processing the gesture information, but only the source device is capable of processing raw data, the sink device may transmit raw data to the source device through the HEC, and even if the sink device is capable of processing gesture information, in case size of the raw data exceeds HEC Data Capability, the sink device may transmit meta data through the CEC or raw data through the HEC.

Also, depending on situations, the sink device may transmit raw data through the HEC and metadata through the CEC.

In a yet another embodiment, in case the source device is equipped with a camera, the role of the sink device as shown in FIG. 28 may be performed by the source device and the role of the source device by the sink device.

FIGS. 29 and 30 illustrate a structure of a CEC (Consumer Electronics Control) command according to an embodiment of the present invention.

FIG. 29 illustrates CEC commands for requesting and transmitting gesture information according to the present invention; a sink device or a source device may request metadata through the <Request Gesture Capability> message and receive metadata through the <Report Gesture Capability> message.

FIG. 30 illustrates operands included in the CEC messages of FIG. 29; through the metadata, gesture information related to face, hand, and body may be transmitted.

The metadata may include coordinate information such as x-axis, y-axis, width, and height.

FIGS. 31 and 32 illustrate a data structure for the case in which gesture information is transmitted through HEC (HDMI Ethernet Channel) according to an embodiment of the present invention.

With reference to FIGS. 31 and 32, raw data including gesture information may be transmitted through a MAC frame of the HEC.

More specifically, gesture information of the raw data may be transmitted being included in a data field of the MAC frame shown in FIG. 31.

The gesture information included in the data field comprises a header and payload, and as shown in FIG. 32(*c*), the header may include a Format field, Resolution field, Gesture_op field, Gesture_Rev field and/or Payload Info field. The gesture information may be transmitted being included in the payload field.

Various substitutions, modifications, and changes may be made to the present invention described above by those skilled in the art to which the present invention belongs without leaving the technical scope of the present invention; therefore, the present invention is not limited to the embodiments above and appended drawings.

What is claimed is:

1. A method performed in a source device for a communication by using High Definition Media Interface (HDMI), the method comprising:
    connecting to a sink device through the HDMI;
    requesting, to the sink device, Extended Display Identification Data (EDID), when the sink device is connected;
    receiving, from the sink device, the EDID including capability information of the sink device; and
    transmitting, to the sink device, gesture information based on the capability information,
    wherein the capability information includes first information related to whether the sink device supports processing the gesture information obtained by the source device and second information related to whether the sink device supports raw data processing for the gesture information,
    wherein the first information is included in byte 6 of a Vendor-Specific Data Block (HF-VSDB),
    wherein the second information is included in byte 7 of the HF-VSDB,
    wherein the gesture information is transmitted as a raw data format or a meta data format extracted from the raw data format, based on the second information,
    wherein the gesture information is transmitted as the meta data format via an HDMI Consumer Electronics Control (CEC) channel, when the sink device does not support the raw data processing, and
    wherein the gesture information is transmitted as the raw data format via an HDMI Ethernet Channel (HEC), when the sink device supports the raw data processing.

2. The method of claim 1,
    wherein the raw data format is video data or image data configured with a brightness signal and chrominance signal, and
    wherein the meta data format is extracted using the brightness signal.

3. The method of claim 2, further comprising:
    receiving, from the sink device, an inquiry message requesting status information for availability of the HEC; and
    transmitting, to the sink device, a first reporting message including the status information,
    wherein the status information relates to either activation or inactivation of the HEC.

4. The method of claim 3, the method further comprises, when the status information relates to inactivation of the HEC:
    receiving, from the sink device, a set message which activates the HEC; and
    transmitting, to the sink device, a second reporting message which includes status information for activation status of the HEC, after activating the HEC.

5. A method performed in a sink device for a communication by using High Definition Media Interface (HDMI), the method comprising:
    receiving, from a source device, a write request of capability information of the source device included in a Status and Control Data Channel Structure (SCDCS);
    reading the capability information; and
    transmitting, to the source device, gesture information based on the capability information,
    wherein the capability information includes first information related to whether the source device supports processing the gesture information and first information related to whether the source device supports processing the gesture information and second information related to whether the source device supports raw data processing for the gesture information,
    wherein the gesture information is transmitted as a raw data format or a meta data format extracted from the raw data format, based on the second information,
    wherein the first information is included in bit 2 of a configuration field of the SCDCS,
    wherein the second information is included in bit 3 of the configuration field,
    wherein the gesture information is transmitted as the meta data format via an HDMI Consumer Electronics Control (CEC) channel, when the sink device does not support the raw data processing, and
    wherein the gesture information is transmitted as the raw data format via an HDMI Ethernet Channel (HEC), when the sink device supports the raw data processing.

6. The method of claim 5, wherein the raw data format is video data or image data configured with a brightness signal and chrominance signal, and
    wherein the meta data format is extracted using the brightness signal.

7. The method of claim 6, further comprising:
    receiving, from the source device, an inquiry message requesting status information for availability of the HEC; and
    transmitting, to the source device, a first reporting message including the status information,
    wherein the status information relates to either activation or inactivation of the HEC.

8. The method of claim 7, the method further comprises, when the status information relates to inactivation of the HEC:
    receiving, from the source device, a set message which activates the HEC; and
    transmitting, to the source device, a second reporting message which includes status information for activation status of the HEC, after activating the HEC.

9. A source device for a communication by using High Definition Media Interface (HDMI), the source device comprising:
    an HDMI transmitter transmitting and receiving data through the HDMI; and
    a controller controlling the HDMI transmitter, wherein the source device:
    requests, to a sink device, Extended Display Identification Data (EDID), when the sink device is connected;
    receives, from the sink device, the EDID including capability information of the sink device; and
    transmits, to the sink device, gesture information based on the capability information,
    wherein the capability information includes first information related to whether the sink device supports processing the gesture information obtained by the source device and second information related to whether the sink device supports raw data processing for the gesture information, wherein the first information is included in byte 6 of a Vendor-Specific Data Block (HF-VSDB), wherein the second information is included in byte 7 of the HF-VSDB, wherein the gesture information is transmitted as a raw data format or a meta data format extracted from the raw data format, based on the second information, wherein the gesture information is transmitted as the meta data format via an HDMI Consumer Electronics Control (CEC) channel, when the sink device does not support the raw data processing, and wherein the gesture information is transmitted as the raw data format via an HDMI Ethernet Channel (HEC), when the sink device supports the raw data processing.

10. The device of claim 9, wherein the raw data format is video data or image data configured with a brightness signal and chrominance signal, and wherein the meta data format is extracted using the brightness signal.

11. A sink device for a communication by using High Definition Media Interface (HDMI), the sink device comprising:

an HDMI transmitter transmitting and receiving data through the HDMI; and a controller controlling the HDMI transmitter, wherein the sink device:

receives, from a source device, a write request of capability information of the source device included in an SCDCS (Status and Control Data Channel Structure);

reads the capability information; and transmits, to the source device, gesture information based on the capability information, wherein the capability information includes first information related to whether the source device supports processing the gesture information obtained by the sink device and second information related to whether the source device supports raw data processing for the gesture information, wherein the first information is included in bit 2 of a configuration field of the SCDCS, wherein the second information is included in bit 3 of the configuration field, wherein the gesture information is transmitted as a raw data format or a meta data format extracted from the raw data format, based on the second information, wherein the gesture information is transmitted as the meta data format via an HDMI Consumer Electronics Control (CEC) channel, when the source device does not support the raw data processing, and wherein the gesture information is transmitted as the raw data format via an HDMI Ethernet Channel (HEC), when the source device supports the raw data processing.

12. The device of claim 11, wherein the raw data format is video data or image data configured with a brightness signal and chrominance signal, and wherein the meta data format is extracted using the brightness signal.

\* \* \* \* \*